(12) United States Patent
O et al.

(10) Patent No.: US 12,556,449 B2
(45) Date of Patent: Feb. 17, 2026

(54) COMMUNICATION SYSTEM, INTEGRATED CONTROLLER, CONTROL APPARATUS AND SWITCHING METHOD

(71) Applicant: NTT, Inc., Tokyo (JP)

(72) Inventors: Hiroshi O, Musashino (JP); Tatsuya Shimada, Musashino (JP); Tomoya Hatano, Musashino (JP); Sei Kou, Musashino (JP); Takashi Yamada, Musashino (JP); Hirotaka Ujikawa, Musashino (JP); Yushi Koyasako, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/834,881

(22) PCT Filed: Nov. 10, 2022

(86) PCT No.: PCT/JP2022/041853
§ 371 (c)(1),
(2) Date: Jul. 31, 2024

(87) PCT Pub. No.: WO2023/157399
PCT Pub. Date: Aug. 24, 2023

(65) Prior Publication Data
US 2025/0260617 A1    Aug. 14, 2025

(30) Foreign Application Priority Data

Feb. 17, 2022   (WO) .................. PCT/JP2022/006351

(51) Int. Cl.
*H04L 41/0823*   (2022.01)
*H04L 45/42*   (2022.01)

(52) U.S. Cl.
CPC .......... *H04L 41/0823* (2013.01); *H04L 45/42* (2013.01)

(58) Field of Classification Search
CPC ...... H04L 41/0823; H04L 45/42; H04L 45/22
See application file for complete search history.

(56) References Cited

U.S. PATENT DOCUMENTS

| | | | |
|---|---|---|---|
| 7,957,359 B1 * | 6/2011 | Robson | H04W 16/12 455/450 |
| 9,369,200 B1 * | 6/2016 | Schmidtke | H04L 45/02 |

(Continued)

FOREIGN PATENT DOCUMENTS

| | | | |
|---|---|---|---|
| CN | 104639415 A | * | 5/2015 |
| JP | 2010068139 A | * | 3/2010 |

(Continued)

*Primary Examiner* — Chris Parry
*Assistant Examiner* — Dixon F Dabipi

(57) ABSTRACT

A communication system that includes a plurality of cloud resources, and a plurality of communication devices provided on a path for using any one of the plurality of cloud resources, the communication system including: a cloud controller that collects cloud information regarding the plurality of cloud resources from each of the plurality of cloud resources and performs setting change of the plurality of cloud resources; a network controller that collects NW information regarding the plurality of communication devices and a network formed by the plurality of communication devices from each of the plurality of communication devices and gives an instruction for path switching in the plurality of communication devices; and an integrated controller that collects the cloud information from the cloud controller, collects the NW information from the network controller, and gives at least one of an instruction for setting change of the cloud resources to the cloud controller or an instruction for path switching to the network controller on the basis of the cloud information and the NW information collected.

6 Claims, 10 Drawing Sheets

(56) References Cited

U.S. PATENT DOCUMENTS

| | | | |
|---|---|---|---|
| 9,369,785 B1 * | 6/2016 | Schmidtke | H04L 45/42 |
| 2012/0204051 A1 | 8/2012 | Murakami et al. | |
| 2015/0350102 A1 * | 12/2015 | Leon-Garcia | H04L 47/781 |
| | | | 709/226 |

FOREIGN PATENT DOCUMENTS

| | | | |
|---|---|---|---|
| JP | 2011082799 A | | 4/2011 |
| JP | 2013179456 A | * | 9/2013 |
| JP | 2017045301 A | * | 2/2017 |

* cited by examiner ical Application No. PCT/JP2022/041853, filed on Nov. 10, 2022, which claims priority to International Application No. PCT/JP2022/006351, filed on Feb. 17, 2022. The entire disclosures of the above applications are incorporated herein by reference.

The present application claims priority on the basis of PCT/JP2022/006351 filed in Japan on Feb. 17, 2022, the contents of which are incorporated herein by reference.

TECHNICAL FIELD

The present invention relates to a communication system, an integrated controller, a control device, and a switching method.

BACKGROUND ART

FIG. 10 is a diagram illustrating a configuration example of a conventional communication system 1. The communication system 1 includes a terminal device 2, a plurality of communication devices 3-1 to 3-4, and a plurality of cloud resources 4-1 to 4-2. The terminal device 2 is a user terminal used by a user. The plurality of communication devices 3-1 to 3-4 are relay devices that transfer signals between the terminal device 2 and the cloud resources 4-1 to 4-2. The cloud resource 4-1 is a resource for providing a cloud service. For example, the cloud resource 4-1 may be a server, a database, or a storage. The cloud resource 4-2 is a spare resource used in a case where the cloud resource 4-1 cannot be used due to a failure or the like.

In the communication system 1 illustrated in FIG. 10, in a case where the user uses the cloud resource 4-1, it is necessary to secure a network from a use base (for example, the terminal device 2) to the cloud resource 4-1 separately from securing the cloud resource 4-1. It is assumed that a failure occurs in a section between the communication device 3-1 and the communication device 3-2 in a situation where the user uses a cloud resource via a path indicated by a dotted line 5 (the terminal device 2⇔the communication device 3-1⇔the communication device 3-2⇔the cloud resource 4-1). Since this is a failure of the network, in this case, it is conceivable to search for a detour path and secure a path of the terminal device 2⇔the communication device 3-1⇔the communication device 3-4⇔the communication device 3-3⇔the communication device 3-2⇔the cloud resource 4-1 as a new communication path to restore communication. However, there is a risk that a path delay increases in some cases.

In a case where the communication device 3-2 fails, a path to the cloud resource 4-1 cannot be secured, and the user cannot use the cloud resource 4-1. Further, in a case where a large-scale failure occurs in the cloud resource 4-1 and another resource in the base cannot be used, switching is performed to the cloud resource 4-2 provided in another base. However, in that case, resetting of the path is required separately from switching of the cloud resources.

CITATION LIST

Patent Literature

Patent Literature 1: JP 2010-68139 A

SUMMARY OF INVENTION

Technical Problem

In a conventional technology, since a redundancy function of a cloud resource and a redundancy configuration of a network are independent of each other, optimization is achieved for the cloud resource or the network alone. For that reason, in a case where it is necessary to change a configuration depending on occurrence of a failure or a change in a facility or a user usage status, it is necessary to perform switching of cloud resources and networks by a cloud controller that performs setting change of the cloud resource and a network controller that performs setting change of the network in conjunction with each other. However, in the conventional method, since the controllers are not in conjunction with each other, there has been a case where a delay is increased or continuous provision of a service becomes difficult.

In view of the above circumstances, an object of the present invention is to provide a technology capable of achieving continuous provision of a service while suppressing a delay.

Solution to Problem

An aspect of the present invention is a communication system that includes a plurality of cloud resources, and a plurality of communication devices provided on a path for using any one of the plurality of cloud resources, the communication system including: a cloud controller that collects cloud information regarding the plurality of cloud resources from each of the plurality of cloud resources and performs setting change of the plurality of cloud resources; a network controller that collects NW information regarding the plurality of communication devices and a network formed by the plurality of communication devices from each of the plurality of communication devices and gives an instruction for path switching in the plurality of communication devices; and an integrated controller that collects the cloud information from the cloud controller, collects the NW information from the network controller, and gives at least one of an instruction for setting change of the cloud resources to the cloud controller or an instruction for path switching to the network controller on the basis of the cloud information and the NW information collected.

An aspect of the present invention is an integrated controller including: a first information collection unit that collects cloud information from a cloud controller that collects the cloud information regarding a plurality of cloud resources from each of the plurality of cloud resources and performs setting change of the plurality of cloud resources; a second information collection unit that collects NW information from a network controller that collects the NW information regarding a plurality of communication devices provided on a path for using any one of the plurality of cloud resources and a network formed by the plurality of communication devices from each of the plurality of communication devices and gives an instruction for path switching in the plurality of communication devices; and a switching instruction unit that gives at least one of an instruction for setting change of the cloud resources to the cloud controller or an instruction for path switching to the network controller on the basis of the cloud information collected by the first information collection unit and the NW information collected by the second information collection unit.

An aspect of the present invention is a control device including: a switching determination unit that determines whether or not switching of at least one of cloud resources or communication paths is necessary on the basis of both cloud information regarding a plurality of cloud resources and NW information regarding a plurality of communication devices provided on a path for using any one of the plurality of cloud resources and a network formed by the plurality of communication devices; a switching destination determination unit that determines an optimal switching destination on the basis of a determination result by the switching determination unit, the cloud information, and the NW information; and a switching instruction unit that gives at least one of an instruction for setting change of the cloud resources or an instruction for switching of the communication paths to perform switching to the optimal switching destination determined by the switching destination determination unit.

An aspect of the present invention is a switching method in a communication system that includes a plurality of cloud resources, and a plurality of communication devices provided on a path for using any one of the plurality of cloud resources, the switching method including: collecting cloud information regarding the plurality of cloud resources from each of the plurality of cloud resources and performing setting change of the plurality of cloud resources; collecting NW information regarding the plurality of communication devices and a network formed by the plurality of communication devices from each of the plurality of communication devices and giving an instruction for path switching in the plurality of communication devices; and collecting the cloud information and the NW information, and giving at least one of an instruction for setting change of the cloud resources or an instruction for path switching on the basis of the cloud information and the NW information collected.

Advantageous Effects of Invention

According to the present invention, it is possible to achieve continuous provision of a service while suppressing a delay.

DESCRIPTION OF EMBODIMENTS

Hereinafter, embodiments of the present invention will be described with reference to the drawings.

First Embodiment

Figure 1:
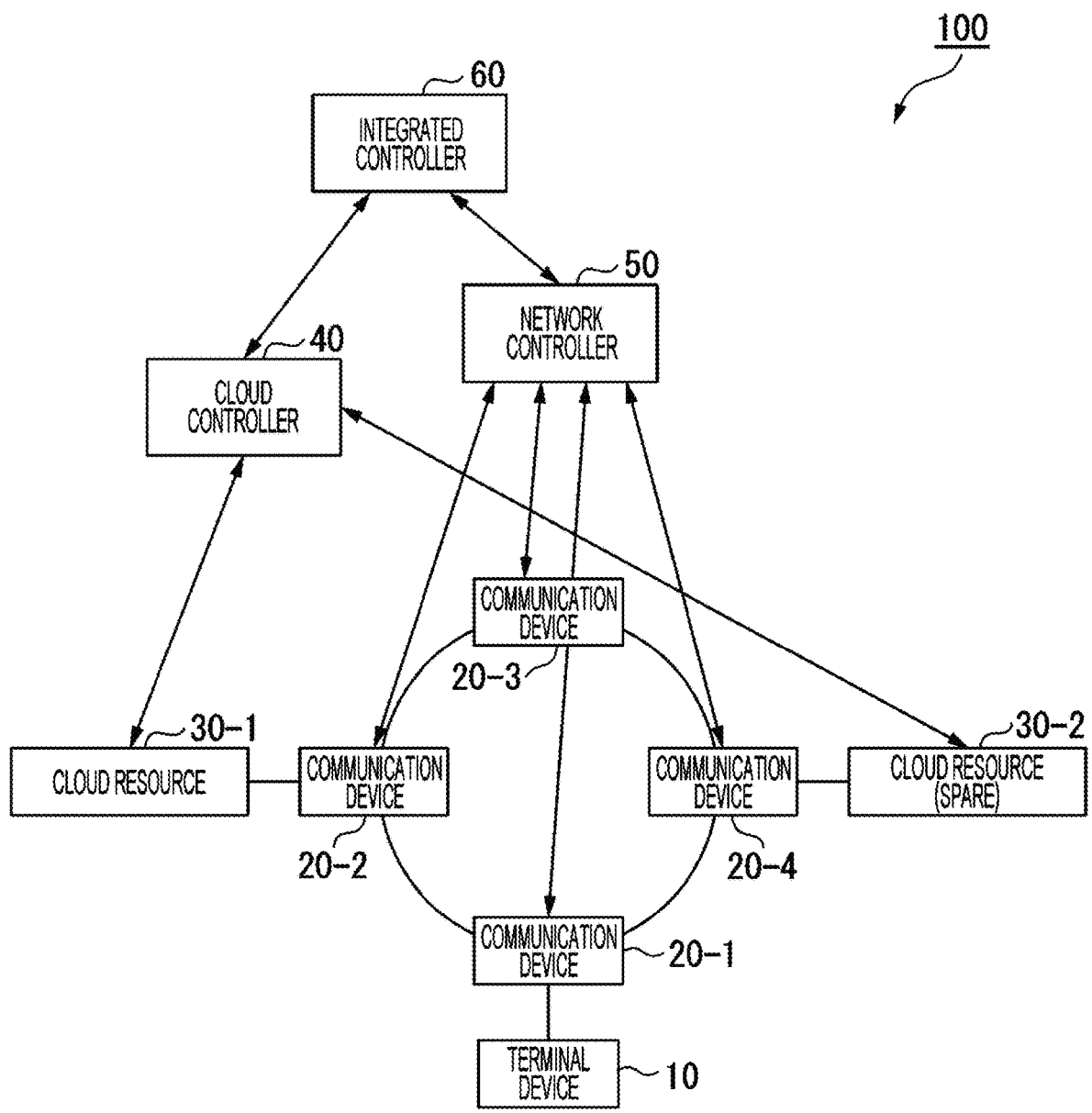
FIG. 1 is a diagram illustrating a configuration example of a communication system in a first embodiment.

FIG. 1 is a diagram illustrating a configuration example of a communication system 100 in a first embodiment. The communication system 100 includes a terminal device 10, a plurality of communication devices 20-1 to 20-4, a plurality of cloud resources 30-1 to 30-2, a cloud controller 40, a network controller 50, and an integrated controller 60. Note that, in the following description, the communication devices 20-1 to 20-4 will be referred to as communication devices 20 unless otherwise distinguished, and the cloud resources 30-1 to 30-2 will be referred to as cloud resources 30 unless otherwise distinguished. The numbers of pieces of the terminal device 10, the communication devices 20, and the cloud resources 30 included in the communication system 100 are not limited to the numbers of pieces illustrated in FIG. 1.

In the communication system 100 illustrated in FIG. 1, an example is illustrated in which the communication devices 20-1 to 20-4 form a ring network, the terminal device 10 is connected to the communication device 20-1, the cloud resource 30-1 is connected to the communication device 20-2, and the cloud resource 30-2 is connected to the communication device 20-4. Further, in the communication system 100, each cloud resource 30 is connected to the cloud controller 40, the network controller 50 is connected to each communication device 20, and the integrated controller 60 is connected to the cloud controller 40 and the network controller 50.

The terminal device 10 is a user terminal used by a user, and is, for example, a device that receives provision of a service by the cloud resource 30-1 or 30-2.

The communication device 20 is a relay device that transfers a signal between the terminal device 10 and the cloud resources 30. The communication device 20 changes settings of a signal transfer path and the like in response to an instruction from the network controller 50. Changing the setting of the signal transfer path means, for example, switching signal transfer paths.

The cloud resource 30-1 is a resource for providing a cloud service. The cloud resource 30-1 may be, for example, a server including at least one of a central processing unit (CPU), a graphics processing unit (GPU), a field programmable gate array (FPGA), or the like, or may be a database or a storage having a memory. The cloud resource 30-1 is only required to be a resource that performs some processing on the communication data of the user. The cloud resource 30-1 changes a setting of a resource to be allocated to the terminal device 10 in response to an instruction from the cloud controller 40. Changing the setting of resource allocation means, for example, changing an amount of resource allocation.

The cloud resource 30-2 is a spare resource used instead of the cloud resource 30-1. A case of being used instead of the cloud resource 30-1 is, for example, a case where a condition of setting change of the cloud resources 30 is satisfied, such as a case where the cloud resource 30-1 fails, a case where a failure (in FIG. 1, for example, a failure of the communication device 20-2, disconnection of a path to the communication device 20-2, or the like) occurs in a path for using the cloud resource 30-1, a case where a delay is less in using the cloud resource 30-2 than in using the cloud resource 30-1, or a case where a CPU usage rate is greater than or equal to a threshold. The condition of setting change of the cloud resources 30 is a condition for switching a cloud resource 30 used by the terminal device 10 to another cloud resource 30 or changing the amount of resource allocation. The cloud resource 30-2 may be, for example, a server, a database, or a storage. The cloud resource 30-2 changes a setting of a resource to be allocated to the terminal device 10 in response to an instruction from the cloud controller 40.

The cloud controller 40 is a control device that sets and monitors the cloud resources 30. The cloud controller 40 collects information regarding the cloud resources 30 and notifies the integrated controller 60 of the collected information. A trigger for the cloud controller 40 to transmit the information regarding the cloud resources 30 to the integrated controller 60 may be periodic or only in a case where a predetermined condition is satisfied. In a case where an instruction to change the cloud resources 30 is obtained from the integrated controller 60, the cloud controller 40 gives an instruction for setting change to the cloud resources 30. For example, in a case where an instruction to change a cloud resource 30 to be used by the terminal device 10 is obtained, the cloud controller 40 performs setting of a resource to be allocated to the terminal device 10 for the cloud resource 30 to be used by the terminal device 10.

The network controller 50 sets and monitors the communication devices 20 and monitors the network. Setting the communication devices 20 is setting signal transfer paths. Monitoring the communication devices 20 is monitoring whether or not failures occur in the communication devices 20 and usage statuses of the communication devices 20. Monitoring the network is monitoring whether a failure (for example, disconnection or the like) or congestion occurs in the network or monitoring a band usage rate, a transfer delay, or the like. The network controller 50 collects information regarding the communication devices 20 and the network, and notifies the integrated controller 60 of the collected information. A trigger for the network controller 50 to transmit the information regarding the network to the integrated controller 60 may be periodic or only in a case where a predetermined condition is satisfied. In a case where an instruction for path switching is obtained from the integrated controller 60, the network controller 50 gives an instruction for switching of the paths to a communication device 20 for which switching of the paths is necessary.

Depending on the information obtained from the cloud controller 40 and the network controller 50, the integrated controller 60 determines optimal cloud resource arrangement and network path in consideration of usage statuses of the cloud resources 30 and a usage status of the network. The integrated controller 60 instructs at least one of the cloud controller 40 or the network controller 50 to perform switching depending on the determined cloud resource arrangement and network path.

The communication system 100 in the first embodiment is a system for performing total delay guarantee in a case where the user uses a cloud resource via a network. Specifically, in the communication system 100, in a situation where the cloud resource and the network are used in conjunction with each other, the cloud controller 40 and the network controller 50 perform switching of the cloud resources 30 and networks in conjunction with each other when a configuration change is necessary depending on occurrence of a failure or a change in a facility or user usage status.

Here, for example, the following three patterns are assumed as situations in which the configuration change is necessary. A first pattern is a case where it is necessary to change the cloud resource to another base. A second pattern is a case where it is necessary to switch network paths. A third pattern is a case where a communication device to be used is changed, for example, a user terminal (for example, the terminal device 10) is connected in a wireless environment. In other words, the third pattern is a case where the communication device used (connected) by the user terminal is changed in an environment such as where the user terminal is connected in a wireless environment.

In the communication system 100 in the first embodiment, in the case of the first pattern (due to the cloud resource), the cloud controller 40 notifies the integrated controller 60 of an event, and the integrated controller 60 instructs the cloud controller 40 to change the cloud resources and instructs the network controller 50 to switch the paths, whereby linked switching is performed. Here, the first pattern (due to the cloud resource) is a case where an event due to the cloud resource 30-1 occurs, such as a case where the CPU usage rate of the cloud resources 30-1 is greater than or equal to the threshold.

In the communication system 100 in the first embodiment, in the case of the second pattern (due to the network), the network controller 50 notifies the integrated controller 60 of an event, and the integrated controller 60 instructs the cloud controller 40 to change the cloud resources and instructs the network controller 50 to switch the paths, whereby linked switching is performed. Here, the second pattern (due to the network) is a case where an event due to the network path occurs, such as a failure of the communication device 20 (for example, a failure of the communication device 20-2), an increase in delay in the path due to network congestion, or a disconnection of the path (for example, failure of the path to the communication device 20-2).

In the communication system 100 in the first embodiment, in the case of the third pattern (due to the user), the network controller 50 notifies the integrated controller 60 of an event, and the integrated controller 60 instructs the cloud controller 40 to change the cloud resources and instructs the network controller 50 to switch the paths, whereby linked switching is performed. Here, the third pattern (due to the user) is a case where an event due to the user occurs, such as a case where the communication device to which the terminal device 10 is connected by wireless communication is changed from the communication device 20-1 to the communication device 20-4.

As described above, the integrated controller 60 gives an instruction for switching to the cloud controller 40 and the network controller 50, whereby the cloud controller 40 and the network controller 50 can operate in conjunction with each other. As a result, the delay can be minimized. Note that, in a case where it is not necessary to perform switching by either the cloud controller 40 or the network controller 50, the integrated controller 60 is only required to give an instruction for switching only to a controller for which switching is necessary.

Hereinafter, a description will be given of a specific configuration of the communication system 100 for achieving the above operation.

Figure 2:
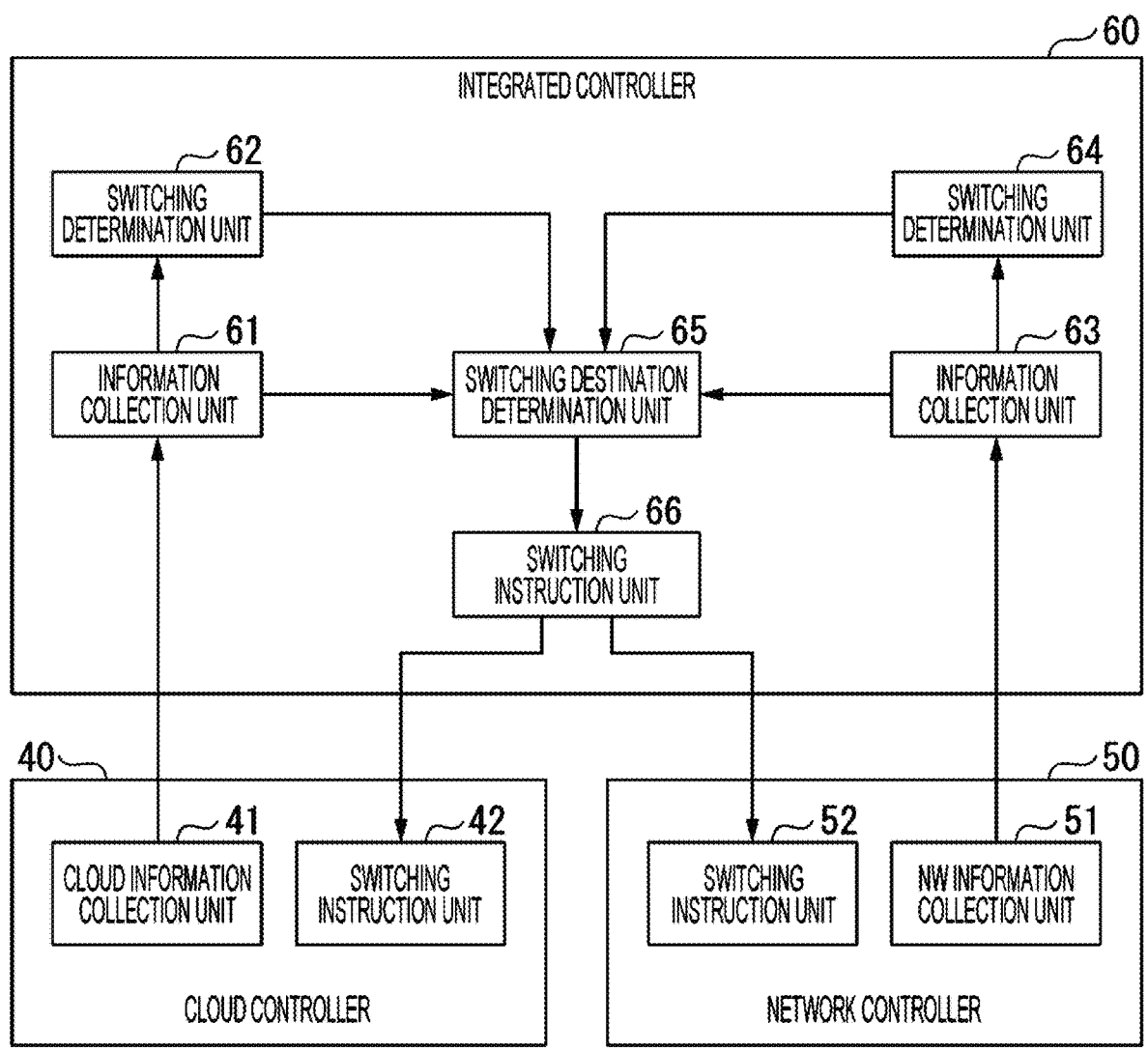
FIG. 2 is a diagram illustrating an example of functional configurations of a cloud controller, a network controller, and an integrated controller in the first embodiment.

FIG. 2 is a diagram illustrating an example of functional configurations of the cloud controller 40, the network controller 50, and the integrated controller 60 in the first embodiment. First, the functional configuration of the cloud controller 40 will be described.

The cloud controller 40 includes a cloud information collection unit 41 and a switching instruction unit 42. The cloud information collection unit 41 collects, from each cloud resource 30, cloud information such as a cloud usage status (whether or not the cloud is being used), a CPU usage rate, an amount of free resources, and a processing delay time.

The switching instruction unit 42 instructs the cloud resource 30 to change the setting in response to an instruction transmitted from integrated controller 60.

Next, the functional configuration of the network controller 50 will be described.

The network controller 50 includes an NW information collection unit 51 and a switching instruction unit 52. The NW information collection unit 51 collects NW information from each communication device 20. The NW information is information regarding the communication devices 20 and a network formed by the communication devices 20-1 to 20-4, and includes, for example, information such as a usage status of each device, a band usage rate, and a transfer delay. Note that the NW information collection unit 51 may collect an end-to-end delay time including a network delay and a cloud delay measured by the terminal device 10 via the communication devices 20. The switching instruction unit 52 instructs the communication devices 20 to change the setting in response to an instruction transmitted from the integrated controller 60.

Next, the functional configuration of the integrated controller 60 will be described.

The integrated controller 60 includes an information collection unit 61, a switching determination unit 62, an information collection unit 63, a switching determination unit 64, a switching destination determination unit 65, and a switching instruction unit 66.

The information collection unit 61 collects cloud information from the cloud controller 40. The information collection unit 61 outputs, to the switching determination unit 62, determination information (for example, failure information on the cloud resource 30, delay information in the cloud resource 30, and a CPU usage rate of the cloud resource 30) necessary for determination of switching in the collected cloud information, and outputs, to the switching destination determination unit 65, other information (for example, setting information on the cloud resource 30 and resource information on a redundant facility (cloud resource 30-2)).

The switching determination unit 62 determines whether or not switching is necessary on the basis of the determination information output from the information collection unit 61. In a case where it is determined that switching is necessary, the switching determination unit 62 notifies the switching destination determination unit 65 that switching of the cloud resources 30 is necessary. The switching determination unit 62 is an aspect of a cloud switching determination unit.

The information collection unit 63 collects NW information from the network controller 50. The information collection unit 63 outputs, to the switching determination unit 64, determination information (for example, failure information on the communication devices 20 or the network, delay information on the network, and CPU usage rates of the communication devices 20) necessary for determination of switching in the collected NW information, and outputs, to the switching destination determination unit 65, other information (for example, setting information on the communication devices 20).

The switching determination unit 64 determines whether or not switching is necessary on the basis of the determination information output from the information collection unit 63. In a case where it is determined that switching is necessary, the switching determination unit 64 notifies the switching destination determination unit 65 that setting of the communication devices 20 and switching of the paths are necessary. The switching determination unit 64 is an aspect of a path switching determination unit.

The switching destination determination unit 65 determines an optimal switching destination on the basis of the information obtained from the information collection unit 61, the switching determination unit 62, the information collection unit 63, and the switching determination unit 64. When determining the optimal switching destination, the switching destination determination unit 65 grasps the usage statuses of the cloud resources and the communication devices 20, and switches at least one of the cloud resources 30 or the communication paths. The switching destination determination unit 65 is only required to determine the optimal switching destination by using a method of performing measurement by a total delay time, or a method in which resources of the cloud and the communication facility are converted into cost and a value of the cost is minimized.

The switching instruction unit 66 notifies the cloud controller 40 of new cloud resource information and notifies the network controller 50 of new path information on the basis of information regarding the optimal switching destination determined by the switching destination determination unit 65 (Hereinafter referred to as "switching destination information".).

Figure 3:
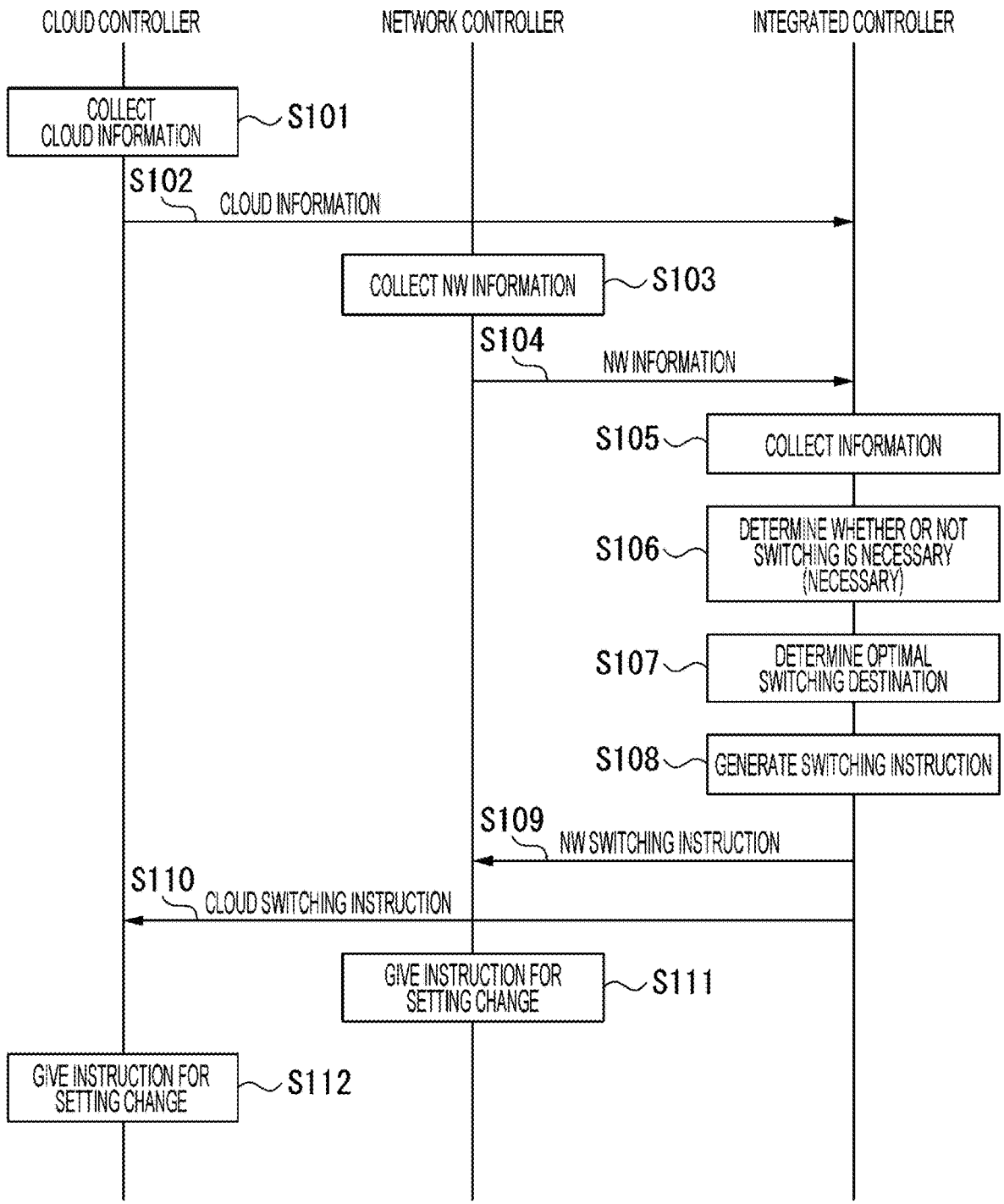
FIG. 3 is a sequence diagram illustrating a flow of processing performed by the communication system in the first embodiment.

FIG. 3 is a sequence diagram illustrating a flow of processing performed by the communication system 100 in the first embodiment.

The cloud information collection unit 41 of the cloud controller 40 collects cloud information (step S101). The cloud information collection unit 41 notifies the integrated controller 60 of the collected cloud information (step S102). The NW information collection unit 51 of the network controller 50 collects NW information (step S103). The NW information collection unit 51 notifies the integrated controller 60 of the collected NW information (step S104).

The integrated controller 60 collects the information of which notification is performed from each of the cloud controller 40 and the network controller 50 (step S105). Specifically, the information collection unit 61 collects the cloud information of which notification is performed from the cloud controller 40. The information collection unit 63 collects the NW information of which notification is performed from the network controller 50. The information collection unit 61 outputs determination information in the collected cloud information to the switching determination unit 62, and outputs other information to the switching destination determination unit 65. The information collection unit 63 outputs determination information in the collected NW information to the switching determination unit 64, and outputs other information to the switching destination determination unit 65.

The switching determination unit 62 and the switching determination unit 64 determine whether or not switching is necessary on the basis of the determination information (step S106). Specifically, the switching determination unit 62 determines whether or not switching of the cloud resources 30 is necessary on the basis of the determination information included in the cloud information obtained from the information collection unit 61, and the switching determination unit 64 determines whether or not switching of transfer paths is necessary on the basis of the determination information included in the NW information obtained from the information collection unit 63. Here, it is assumed that the integrated controller 60 determines that switching of both the cloud resources 30 and the paths is necessary.

In this case, the switching destination determination unit 65 determines an optimal switching destination on the basis of the information output from the information collection unit 61 and the information output from the information collection unit 63 (step S107). Specifically, the switching destination determination unit 65 determines an optimal arrangement of a cloud resource and an optimal network path for using the resource as the optimal switching destination. The switching destination determination unit 65 outputs switching destination information to the switching instruction unit 66.

The switching instruction unit 66 generates a switching instruction on the basis of the switching destination information output from the switching destination determination unit 65 (step S108). Specifically, the switching instruction unit 66 generates a cloud switching instruction including information regarding the cloud resources 30 and an NW switching instruction including the information regarding the network paths by using information included in the switching destination information. The switching instruction unit 66 notifies the network controller 50 of the NW switching instruction (step S109), and notifies the cloud controller 40 of the cloud switching instruction (step S110).

The switching instruction unit 52 of the network controller 50 gives an instruction for switching of the paths of the network to a corresponding communication device 20 in response to the NW switching instruction of which notification is performed from the integrated controller 60 (step S111). The switching instruction unit 42 of the cloud controller 40 gives an instruction for switching of the amount of resource allocation to the cloud resource 30 in response to the cloud switching instruction of which notification is performed from the integrated controller 60 (step S112).

Note that, in the processing of step S106, a case has been described where the integrated controller 60 determines that switching of both the cloud resources 30 and the paths is necessary, as an example; however, the integrated controller 60 may determine that switching of either the cloud resources 30 or the paths is necessary. Even in a case where the integrated controller 60 determines that switching of either the cloud resources 30 or the paths is necessary, there is a case where both the cloud resources 30 and the paths are switched as a result depending on the optimal switching destination. An example thereof will be described later.

In a case where it is determined that switching of both the cloud resources 30 and the paths is not necessary, the integrated controller 60 ends the processing of FIG. 3.

As an example of the processing of the sequence diagram illustrated in FIG. 3, a description will be given of processing in the case of each of the first pattern to the third pattern described above. Here, as a premise, it is assumed that the terminal device 10 uses the cloud resource 30-1 with a path via the communication device 20-1 and the communication device 20-2.

(Example of First Pattern: Case where it is Necessary to Change Cloud Resource to Another Base)

In a case where an event due to the cloud resource 30-1 occurs, such as a case where the CPU usage rate of the cloud resource 30-1 is greater than or equal to the threshold, the switching determination unit 62 of the integrated controller 60 can specify the event due to the cloud resource 30-1 on the basis of the cloud information collected by the information collection unit 61, and thus, determines that the switching of the cloud resources 30 is necessary. On the other hand, since the event due to the cloud resource 30-1 cannot be specified with the NW information collected by the information collection unit 63, the switching determination unit 64 of the integrated controller 60 determines that the setting of the communication devices 20 and the switching of the paths are not necessary.

In this case, the switching destination determination unit 65 determines the following switching destination as the optimal switching destination on the basis of the information obtained from the information collection unit 61, the switching determination unit 62, the information collection unit 63, and the switching determination unit 64. For example, the switching destination determination unit 65 determines the cloud resource 30-2 as the optimal switching destination for the cloud resource 30 to be used by the terminal device 10. In this case, the switching destination determination unit 65 determines that a path via the communication devices 20-1 and 20-4 is an optimal path as a path for the terminal device 10 to use the cloud resource 30-2. Then, the switching destination determination unit 65 outputs, to the switching instruction unit 66, information on the cloud resource 30-2 as the switching destination cloud resource 30, and switching destination information including information on the communication devices 20-1 and 20-4 as the switching destination path.

The switching instruction unit 66 notifies the cloud controller 40 of new cloud resource information and notifies the network controller 50 of new path information on the basis of the switching destination information output from the switching destination determination unit 65. The switching instruction unit 42 of the cloud controller 40 changes the setting for the cloud resource 30-2 depending on the cloud resource information of which notification is performed. The switching instruction unit 52 of the network controller 50 changes the settings for the communication devices 20-1 and 20-4 depending on the path information of which notification is performed.

As described above, information obtained from the cloud controller 40 and the network controller 50 is considered in the integrated controller 60, whereby the cloud resources and the paths can be switched in conjunction with each other even in a case where it is determined that switching is not necessary in one of them. As a result, the terminal device 10 can receive service provision by the cloud resource 30-2 while reducing the delay.

(Example of Second Pattern: Case where it is Necessary to Switch Network Paths)

In a case where an event due to a network path occurs, such as a failure of the communication device 20 (for example, a failure of the communication device 20-2), an increase in delay in a path due to network congestion, or a disconnection of a path (for example, failure of a path to the communication device 20-2), the switching determination unit 62 of the integrated controller 60 determines that there is no switching of the cloud resources 30 since the event due to the network path cannot be specified with the cloud information collected by the information collection unit 61.

On the other hand, since the switching determination unit 64 of the integrated controller 60 can specify the event due to the network path on the basis of the NW information collected by the information collection unit 63, it is determined that setting of the communication devices 20 and switching of the paths are necessary.

In this case, the switching destination determination unit 65 determines the following switching destination as the optimal switching destination on the basis of the information obtained from the information collection unit 61, the switching determination unit 62, the information collection unit 63, and the switching determination unit 64. For example, the switching destination determination unit 65 determines the cloud resource 30-2 as the optimal switching destination for the cloud resource 30 to be used by the terminal device 10. In this case, the switching destination determination unit 65 determines that a path via the communication devices 20-1 and 20-4 is an optimal path as a path for the terminal device 10 to use the cloud resource 30-2. Then, the switching destination determination unit 65 outputs, to the switching instruction unit 66, information on the cloud resource 30-2 as the switching destination cloud resource 30, and switching destination information including information on the communication devices 20-1 and 20-4 as the switching destination path.

The switching instruction unit 66 notifies the cloud controller 40 of new cloud resource information and notifies the network controller 50 of new path information on the basis of the switching destination information output from the switching destination determination unit 65. The switching instruction unit 42 of the cloud controller 40 changes the setting for the cloud resource 30-2 depending on the cloud resource information of which notification is performed. The switching instruction unit 52 of the network controller 50 changes the settings for the communication devices 20-1 and 20-4 depending on the path information of which notification is performed.

As described above, information obtained from the cloud controller 40 and the network controller 50 is considered in the integrated controller 60, whereby the cloud resources and the paths can be switched in conjunction with each other even in a case where it is determined that switching is not necessary in one of them. As a result, the terminal device 10 can receive service provision by the cloud resource 30-2 while reducing the delay.

(Example of Third Pattern: Case where Communication Device to be Used is Changed)

In a case where an event due to the user occurs, such as a case where the communication device to which the terminal device 10 is connected by wireless communication is changed from the communication device 20-1 to the communication device 20-4, the switching determination unit 62 of the integrated controller 60 determines that there is no switching of the cloud resources 30 since the event due to the network path cannot be specified with the cloud information collected by the information collection unit 61. On the other hand, since the switching determination unit 64 of the integrated controller 60 can specify the event due to the user on the basis of the NW information collected by the information collection unit 63, it is determined that setting of the communication devices 20 and switching of the paths are necessary.

In this case, the switching destination determination unit 65 determines the following switching destination as the optimal switching destination on the basis of the information obtained from the information collection unit 61, the switching determination unit 62, the information collection unit 63, and the switching determination unit 64. For example, the switching destination determination unit 65 determines the cloud resource 30-2 closest to the communication device 20-4 as the optimal switching destination for the cloud resource 30 to be used by the terminal device 10. In this case, the switching destination determination unit 65 determines that a path via the communication device 20-4 is the optimal path for the terminal device 10 to use the cloud resource 30-2. Then, the switching destination determination unit 65 outputs, to the switching instruction unit 66, information on the cloud resource 30-2 as the switching destination cloud resource 30, and switching destination information including information on the communication device 20-4 as the switching destination path.

The switching instruction unit 66 notifies the cloud controller 40 of new cloud resource information and notifies the network controller 50 of new path information on the basis of the switching destination information output from the switching destination determination unit 65. The switching instruction unit 42 of the cloud controller 40 changes the setting for the cloud resource 30-2 depending on the cloud resource information of which notification is performed. The switching instruction unit 52 of the network controller 50 changes the setting for the communication device 20-4 depending on the path information of which notification is performed.

As described above, information obtained from the cloud controller 40 and the network controller 50 is considered in the integrated controller 60, whereby the cloud resources and the paths can be switched in conjunction with each other even in a case where it is determined that switching is not necessary in one of them. As a result, the terminal device 10 can receive service provision by the cloud resource 30-2 while reducing the delay.

According to the communication system 100 configured as described above, switching of the cloud resources and switching of the paths of the network that are conventionally managed separately are determined in the integrated controller 60 so that optimal switching destinations are obtained. As a result, in a case where there is a change in the cloud resource, network, and user usage statuses, or the facility status, it is possible to perform optimal resource arrangement and path selection. For that reason, minimization of delay and continuation of communication are achieved, and continuous provision of services can be achieved.

Hereinafter, a modification of the communication system 100 will be described.

Modification 1

Figure 4:
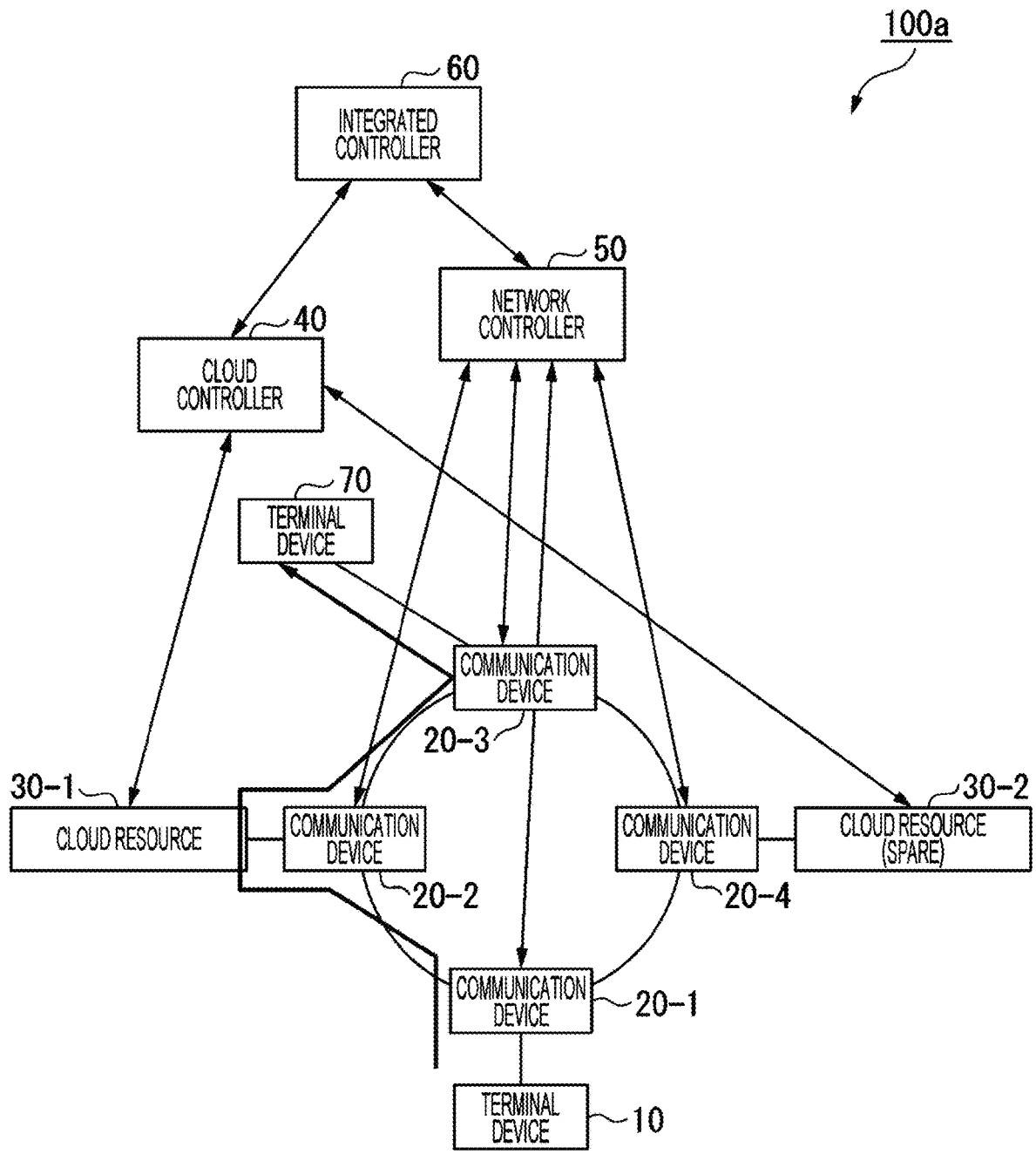
FIG. 4 is a diagram illustrating a configuration example of a communication system in a modification.

In the above-described embodiment, a configuration has been described in which the cloud resource 30 is used in one base (for example, the terminal device 10). On the other hand, as illustrated in FIG. 4, the cloud controller 40, the network controller 50, and the integrated controller 60 in the first embodiment may perform similar processing even under a situation where the cloud resource 30 is used in the middle of passing information from one base (for example, the terminal device 10) to another base (for example, a terminal device 70). FIG. 4 is a diagram illustrating a configuration example of a communication system 100a in a modification. The communication system 100a includes the terminal device 10, the plurality of communication devices 20-1 to 20-4, the plurality of cloud resources 30-1 to 30-2, the cloud controller 40, the network controller 50, the integrated controller 60, and the terminal device 70. The communication system 100*a* is similar to the communication system 100 in terms of a system configuration except that the terminal device 70 is added. Hereinafter, differences will be described. The terminal device 70 is a device to be a communication partner of the terminal device 10.

Second Embodiment

In the first embodiment, the integrated controller determines whether or not switching of the cloud resources is necessary on the basis of the cloud information obtained from the cloud resources, and determines whether or not switching of the networks is necessary on the basis of the NW information obtained from the network controller. In a second embodiment, a description will be given of a configuration in which the integrated controller determines whether or not switching is necessary in consideration of both the cloud information and the NW information in addition to the above configuration.

Figure 5:
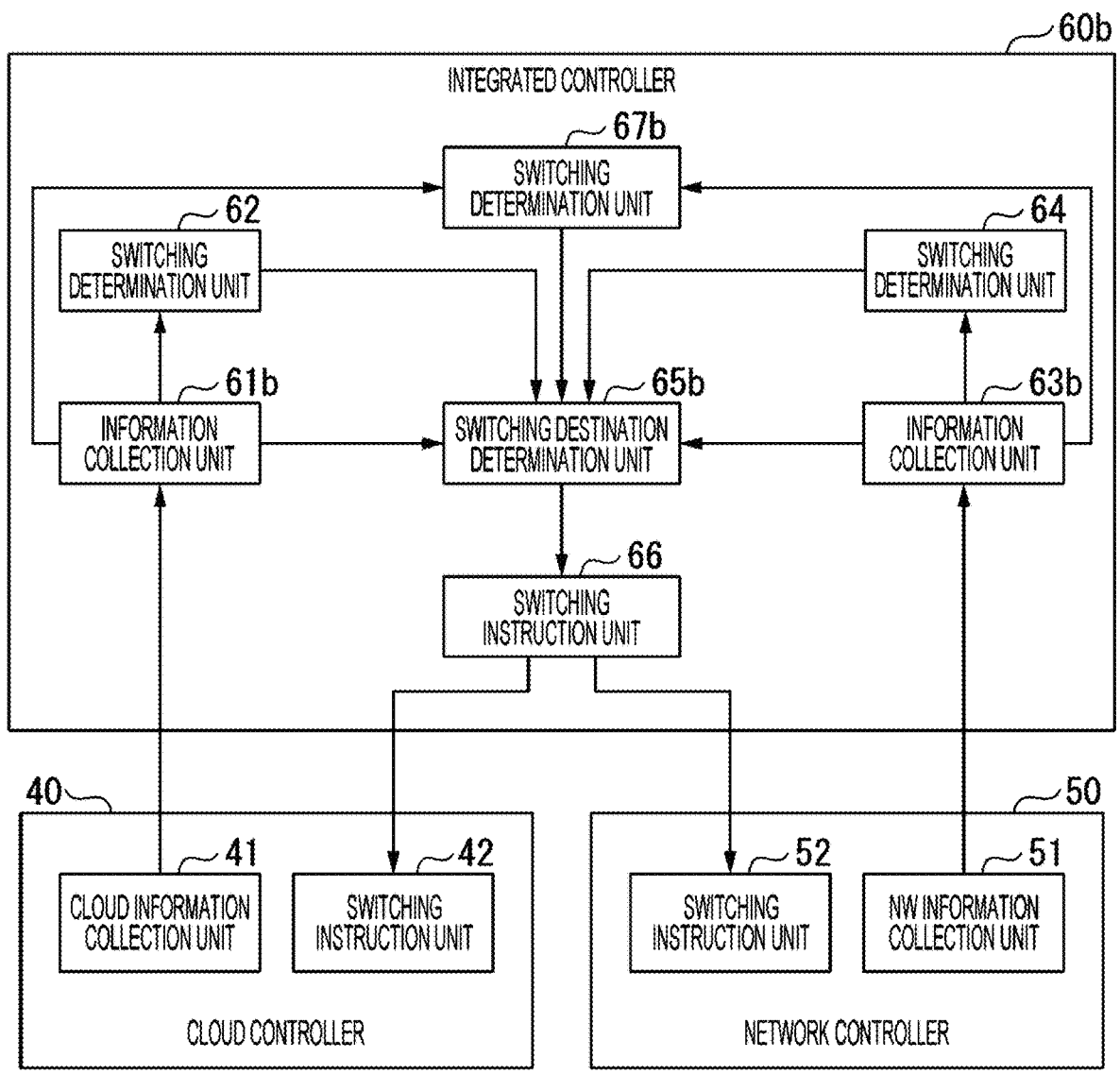
FIG. 5 is a diagram illustrating an example of functional configurations of a cloud controller, a network controller, and an integrated controller in a second embodiment.

FIG. 5 is a diagram illustrating an example of functional configurations of the cloud controller 40, the network controller 50, and an integrated controller 60*b* in the second embodiment. Note that the configurations of the cloud controller 40 and the network controller 50 are similar to those of the first embodiment, and thus description thereof is omitted.

Depending on at least one or both of the cloud information obtained from the cloud controller 40 and the NW information obtained from the network controller 50, the integrated controller 60*b* determines optimal cloud resource arrangement and network path in consideration of usage statuses of the cloud resources 30 and a usage status of the network. The integrated controller 60*b* instructs at least one of the cloud controller 40 or the network controller 50 to perform switching depending on the determined cloud resource arrangement and network path. The integrated controller 60*b* is an aspect of a control device.

The communication system 100 in the second embodiment is a system for performing total delay guarantee in a case where the user uses a cloud resource via a network. Specifically, in the communication system 100 in the second embodiment, in a situation where the cloud resource and the network are used in conjunction with each other, the cloud controller 40 and the network controller 50 perform switching of the cloud resources 30 and networks in conjunction with each other when a configuration change is necessary depending on occurrence of a failure or a change in a facility or user usage status.

In the communication system 100 in the second embodiment, in the case of the first pattern (due to the cloud resource) or the second pattern (due to the network) described above, the integrated controller 60*b* monitors states of the cloud resources and the network via the cloud controller 40 and the network controller 50, and in a case where it is necessary to perform switching, instructs the cloud controller 40 to change the cloud resources and instructs the network controller 50 to switch the paths, whereby linked switching is performed.

In the communication system 100 in the second embodiment, in the case of the third pattern (due to the user) described above, the network controller 50 notifies the integrated controller 60*b* of an event, and the integrated controller 60*b* instructs the cloud controller 40 to change the cloud resources and instructs the network controller 50 to switch the paths, whereby linked switching is performed.

As described above, the integrated controller 60*b* gives an instruction for switching to the cloud controller 40 and the network controller 50, whereby the cloud controller 40 and the network controller 50 can operate in conjunction with each other. Further, the integrated controller 60*b* grasps each event occurring with respect to the cloud resource 30 and the signal transfer path by using both the collected cloud information and NW information, and then integrally determines whether or not switching is necessary, and gives an instruction for switching in a case where it is determined that switching is necessary. Here, "integrally determines" means determination across the cloud resource 30 and the network, for example, determination by comparison of a sum of an amount of processing delay in the cloud resource 30 and a transfer delay in the network with a predetermined condition, or the like. As a result, the delay can be minimized. Note that, in a case where it is not necessary to perform switching by either the cloud controller 40 or the network controller 50, the integrated controller 60*b* is only required to give an instruction for switching only to a controller for which switching is necessary.

Hereinafter, a description will be given of a specific configuration of the integrated controller 60*b* for achieving the above operation.

The integrated controller 60*b* includes an information collection unit 61*b*, the switching determination unit 62, an information collection unit 63*b*, the switching determination unit 64, a switching destination determination unit 65*b*, the switching instruction unit 66, and the switching determination unit 67*b*. The integrated controller 60*b* has a configuration different from that of the integrated controller 60 in that the information collection unit 61*b*, the information collection unit 63*b*, and the switching destination determination unit 65*b* are included instead of the information collection unit 61, the information collection unit 63, and the switching destination determination unit 65, and a switching determination unit 67*b* is newly included. The configuration of the integrated controller 60*b* other than the above is similar to that of the integrated controller 60. Hereinafter, differences from the integrated controller 60 will be mainly described.

The information collection unit 61*b* collects cloud information from the cloud controller 40. The information collection unit 61*b* outputs, to the switching determination unit 62 and the switching determination unit 67*b*, determination information (for example, failure information on the cloud resource 30, delay information in the cloud resource 30, and a CPU usage rate of the cloud resource 30) necessary for determination of switching in the collected cloud information, and outputs, to the switching destination determination unit 65*b*, other information (for example, setting information on the cloud resource 30 and resource information on a redundant facility (cloud resource 30-2)).

The information collection unit 63*b* collects NW information from the network controller 50. The information collection unit 63*b* outputs, to the switching determination unit 64 and the switching determination unit 67*b*, determination information (for example, failure information on the communication devices 20 or the network, delay information on the network, and CPU usage rates of the communication devices 20) necessary for determination of switching in the collected NW information, and outputs, to the switching destination determination unit 65*b*, other information (for example, setting information on the communication devices 20).

The switching determination unit 67*b* integrally determines whether or not switching is necessary on the basis of the determination information output from the information collection unit 61*b* and the determination information output from the information collection unit 63b. In a case where it is determined that switching is necessary, the switching determination unit 67b notifies the switching destination determination unit 65b that switching is necessary. As described above, in comparison with the switching determination units 62 and 64, the switching determination unit 67b determines whether or not switching is necessary on the basis of a plurality of determination materials (for example, the determination information necessary for determination of switching in the cloud information and the determination information necessary for determination of switching in the NW information) rather than one determination material.

The switching destination determination unit 65b determines an optimal switching destination on the basis of the information obtained from the information collection unit 61b, the switching determination unit 62, the information collection unit 63b, the switching determination unit 64, and the switching determination unit 67b. When determining the optimal switching destination, the switching destination determination unit 65b grasps the usage statuses of the cloud resources and the communication devices 20, and switches at least one of the cloud resources 30 or the communication paths.

The switching destination determination unit 65b selects a switching destination that minimizes an influence range due to switching by switching destination determination processing to be described later. In the switching destination determination processing, the optimal switching destination is determined by three steps of a network switching search, a cloud resource switching search, and a network and cloud resource switching search. Note that the order of the three steps of searching for the switching destination candidate may be any order. In a case where it is intended to minimize the influence of the switching, in a case where switching of the paths of the network is performed faster than switching of the cloud resources 30, the network switching search, the cloud resource switching search, and the network and cloud resource switching search may be performed in this order. In a case where the switching of the cloud resources 30 is performed faster than the switching of the paths of the network, the cloud resource switching search, the network switching search, and the network and cloud resource switching search may be performed in this order.

The network switching search is processing of searching for whether or not there is a switching destination candidate suitable for continuous provision of a service by switching only the paths of the network without switching the cloud resources 30. For example, in a case where there is a switching destination candidate in the network switching search, the switching destination determination unit 65b determines the switching destination candidate as the optimal switching destination. Note that, in a case where there is a plurality of switching destination candidates, the switching destination determination unit 65b determines a switching destination candidate having a minimum transfer distance to the cloud resource 30 used by the terminal device 10 as the optimal switching destination. In a case where there is a plurality of switching destination candidates having the minimum transfer distance to the cloud resource 30 used by the terminal device 10, the switching destination determination unit 65b may select any of the switching destination candidates.

The cloud resource switching search is processing of searching for whether or not there is a switching destination candidate suitable for continuous provision of a service by switching only the cloud resources 30 without switching the paths of the network. Here, switching only the cloud resources 30 is, for example, a case where switching is performed between a plurality of cloud resources 30 constructed in the same data center. For example, in a case where there is a switching destination candidate in the cloud resource switching search, the switching destination determination unit 65b determines the switching destination candidate as the optimal switching destination. Note that, in a case where there is a plurality of switching destination candidates, the switching destination determination unit 65b may determine a switching destination candidate having a minimum CPU usage rate as the optimal switching destination, or determine a switching destination candidate having a minimum delay as the optimal switching destination.

The network and cloud resource switching search is processing of searching for whether or not there is a switching destination candidate suitable for continuous provision of a service with both the cloud resources 30 and the paths of the network as switching targets. For example, in a case where there is a switching destination candidate in the network and cloud resource switching search, the switching destination determination unit 65b determines the switching destination candidate as the optimal switching destination. Note that, in a case where there is a plurality of switching destination candidates, the switching destination determination unit 65b determines, as the optimal switching destination, a switching destination candidate having a minimum transfer distance to the cloud resource 30 used by the terminal device 10, a switching destination candidate having a minimum CPU usage rate, or a switching destination candidate having a minimum delay.

As an index for searching for a switching destination candidate in each step of the cloud resource switching search, the network switching search, and the network and cloud resource switching search, the switching destination determination unit 65b uses a method of performing evaluation by a total delay time, or a method in which the cloud resources 30 and resources of the communication facility are converted into cost and a value of the cost is minimized. Note that, in a case where the switching destination candidate is not found even if all the steps are performed, the switching destination determination unit 65b ends the switching destination determination processing without performing switching. At this time, the switching destination determination unit 65b may notify a host controller that the switching destination is not found although it is determined that switching is necessary.

Figure 6:
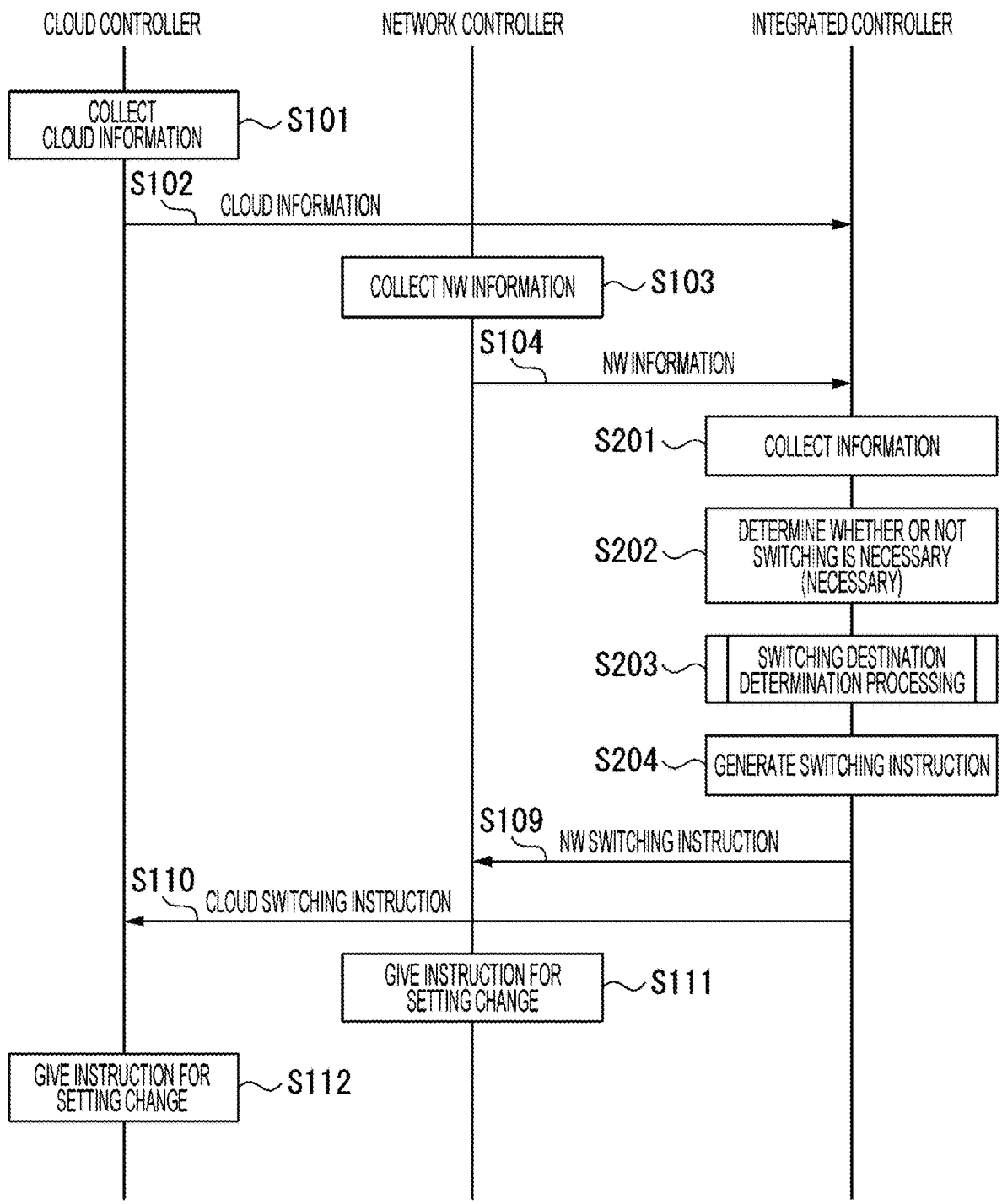
FIG. 6 is a sequence diagram illustrating a flow of processing performed by a communication system in the second embodiment.

FIG. 6 is a sequence diagram illustrating a flow of processing performed by the communication system 100 in the second embodiment. In FIG. 6, processing similar to that illustrated in FIG. 3 is denoted by the same reference numeral as that illustrated in FIG. 3, and description thereof is omitted.

The integrated controller 60b collects information of which notification is performed from each of the cloud controller 40 and the network controller 50 (step S201). Specifically, the information collection unit 61b collects the cloud information of which notification is performed from the cloud controller 40. The information collection unit 63b collects the NW information of which notification is performed from the network controller 50. The information collection unit 61b outputs determination information in the collected cloud information to the switching determination unit 62 and the switching determination unit 67b, and outputs other information to the switching destination determination unit 65b. The information collection unit 63b outputs determination information in the collected NW information to the switching determination unit 64 and the switching determination unit 67b, and outputs other information to the switching destination determination unit 65b.

The switching determination unit 62, the switching determination unit 64, and the switching determination unit 67b determine whether or not switching is necessary on the basis of the determination information (step S202). Specifically, the switching determination unit 62 determines whether or not switching of the cloud resources 30 is necessary on the basis of the determination information included in the cloud information obtained from the information collection unit 61. The switching determination unit 64 determines whether or not switching of the transfer paths is necessary on the basis of the determination information included in the NW information obtained from the information collection unit 63. The switching determination unit 67b determines whether or not switching of at least one of the cloud resources 30 or the transfer paths is necessary on the basis of the determination information included in the cloud information obtained from the information collection unit 61 and the determination information included in the NW information obtained from the information collection unit 63. Here, it is assumed that the integrated controller 60b determines that switching of both the cloud resources 30 and the paths is necessary.

In this case, the switching destination determination unit 65b performs the switching destination determination processing on the basis of the information output from the information collection unit 61b and the information output from the information collection unit 63b (step S203). As a result, the switching destination determination unit 65b determines the optimal switching destination. The switching destination determination unit 65b outputs switching destination information to the switching instruction unit 66.

The switching instruction unit 66 generates a switching instruction on the basis of the switching destination information output from the switching destination determination unit 65b (step S204). Specifically, the switching instruction unit 66 generates a cloud switching instruction including information regarding the cloud resources 30 and an NW switching instruction including the information regarding the network paths by using information included in the switching destination information. After that, the processing in step S109 and the subsequent steps are executed.

Figure 7:
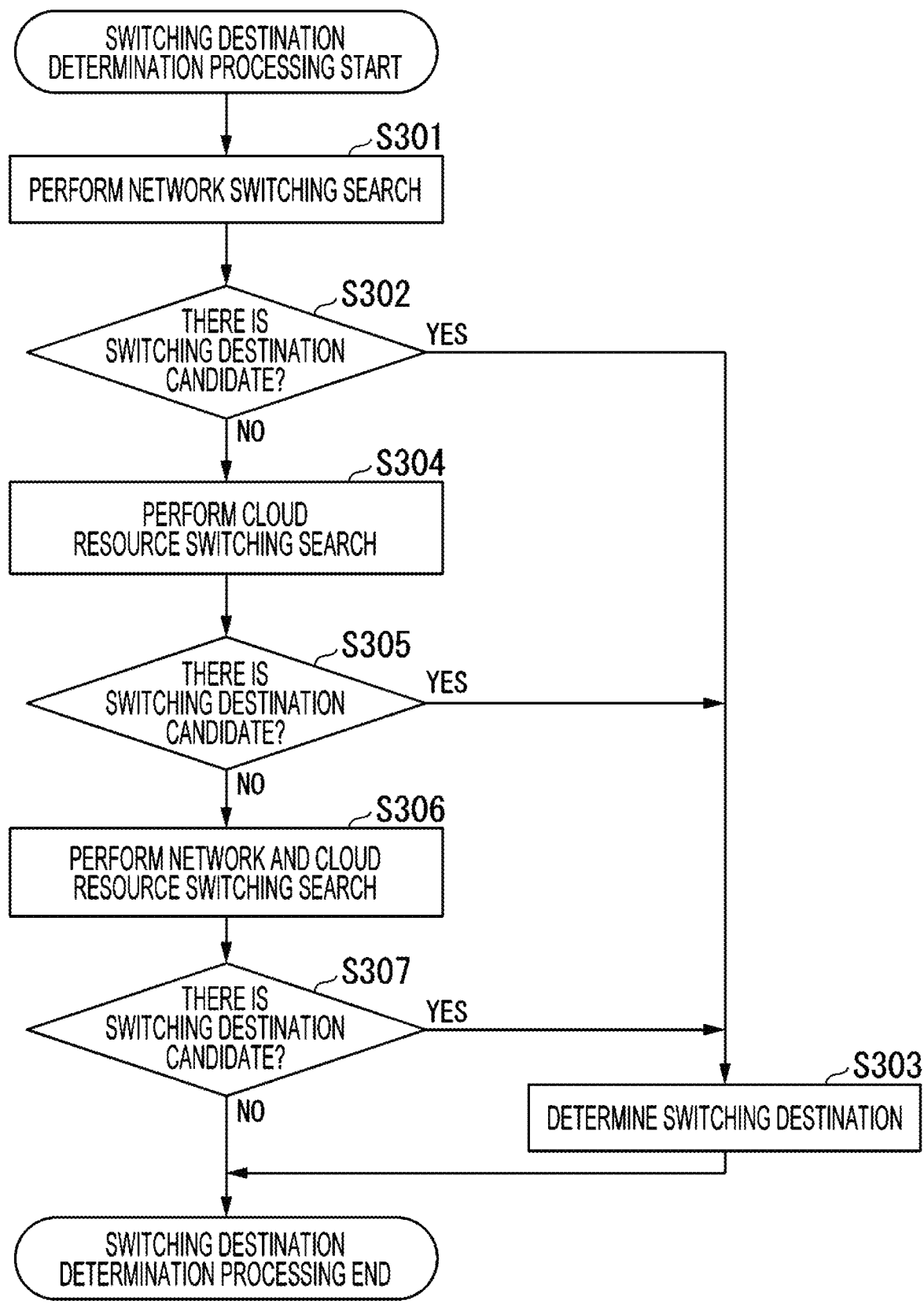
FIG. 7 is a flowchart illustrating a flow of switching destination determination processing performed by the integrated controller in the second embodiment.

FIG. 7 is a flowchart illustrating a flow of the switching destination determination processing performed by the integrated controller 60b in the second embodiment. In the description of FIG. 7, it is assumed that switching of the paths of the network is performed faster than switching of the cloud resources 30.

The switching destination determination unit 65b performs the network switching search on the basis of the information obtained from the information collection unit 63b, the switching determination unit 64, and the switching determination unit 67b (step S301). The switching destination determination unit 65b determines whether or not there is a switching destination candidate as a result of the network switching search (step S302). In a case where it is determined that there is a switching destination candidate (YES in step S302), the switching destination determination unit 65b determines the switching destination candidate as the optimal switching destination (step S303).

On the other hand, in a case where it is determined that there is no switching destination candidate (NO in step S302), the switching destination determination unit 65b performs the cloud resource switching search on the basis of the information obtained from the information collection unit 61b, the switching determination unit 62, and the switching determination unit 67b (step S304). The switching destination determination unit 65b determines whether or not there is a switching destination candidate as a result of the cloud resource switching search (step S305). In a case where it is determined that there is a switching destination candidate (YES in step S305), the switching destination determination unit 65b determines the switching destination candidate as the optimal switching destination (step S303).

On the other hand, in a case where it is determined that there is no switching destination candidate (NO in step S305), the switching destination determination unit 65b performs the network and cloud resource switching search on the basis of the information obtained from the information collection unit 61b, the switching determination unit 62, the information collection unit 63b, the switching determination unit 64, and the switching determination unit 67b (step S306). The switching destination determination unit 65b determines whether or not there is a switching destination candidate as a result of the network and cloud resource switching search (step S307). In a case where it is determined that there is a switching destination candidate (YES in step S307), the switching destination determination unit 65b determines the switching destination candidate as the optimal switching destination (step S303).

On the other hand, in a case where it is determined that there is no switching destination candidate (NO in step S307), the switching destination determination unit 65b determines that there is no switching destination candidate and ends the switching destination determination processing.

According to the communication system 100 in the second embodiment configured as described above, it is possible to obtain effects similar to those of the first embodiment.

Further, in the communication system 100 in the second embodiment, whether or not switching is necessary is determined on the basis of a plurality of determination materials (for example, the determination information necessary for determination of switching in the cloud information and the determination information necessary for determination of switching in the NW information.). As a result, control using the end-to-end quality can be performed. For that reason, more accurate switching determination can be performed.

Modification 1

In the above-described embodiment, the switching determination units 62, 64, and 67b are provided as independent functional units, but functions of the switching determination units 62, 64, and 67b may be configured as one or two functional units. In a case where the functions of the switching determination units 62, 64, and 67b are configured as two functional units, one switching determination unit includes any two functions of the switching determination units 62, 64, and 67b, and the other switching determination unit includes a remaining function among the functions of the switching determination units 62, 64, and 67b.

Third Embodiment

In the first embodiment and the second embodiment, the integrated controller determines whether or not switching is necessary on the basis of the information collected from the cloud controller and the network controller. In a third embodiment, a description will be given of a configuration in which a communication system does not include an integrated controller, and a network controller determines whether or not switching is necessary, determines a switching destination, and gives a switching instruction.

The communication system 100 in the third embodiment includes the terminal device 10, the plurality of communication devices 20-1 to 20-4, the plurality of cloud resources 30-1 to 30-2, a cloud controller 40c, and a network controller 50c. The communication system 100 in the third embodiment has a configuration different from that of the communication system 100 in the first embodiment in that the integrated controller 60 is not included, and the cloud controller 40c and the network controller 50c are included instead of the cloud controller 40 and the network controller 50. Hereinafter, differences will be mainly described.

The cloud controller 40c is a control device that sets and monitors the cloud resources 30. The cloud controller 40c collects information regarding the cloud resources 30 and notifies the network controller 50c of the collected information. A trigger for the cloud controller 40c to transmit the information regarding the cloud resources 30 to the network controller 50c may be periodic or only in a case where a predetermined condition is satisfied. In a case where an instruction to change the cloud resources 30 is obtained from the network controller 50c, the cloud controller 40c gives an instruction for setting change to the cloud resources 30. For example, in a case where an instruction to change the cloud resource 30 to be used by the terminal device 10 is obtained, the cloud controller 40c performs setting of a resource to be allocated to the terminal device 10 for the cloud resource 30 to be used by the terminal device 10.

Further, the cloud controller 40c determines whether or not switching of the cloud resources 30 is necessary on the basis of the collected cloud information. In a case where it is determined that switching is necessary, the cloud controller 40c notifies the network controller 50c that switching of the cloud resources 30 is necessary.

The network controller 50c sets and monitors the communication devices 20 and monitors the network. The network controller 50c collects information regarding the communication devices 20 and the network. In a case where it is determined that path switching is necessary, the network controller 50 gives an instruction for switching of the paths to a communication device 20 for which switching of the paths is necessary.

Further, the network controller 50c determines optimal cloud resource arrangement and network path in consideration of usage statuses of the cloud resources 30 and a usage status of the network depending on at least one or both of the cloud information obtained from the cloud controller 40c and the collected NW information. The network controller 50c instructs the cloud controller 40c to perform switching depending on the determined cloud resource arrangement and network path. The network controller 50c is an aspect of a control device.

Figure 8:
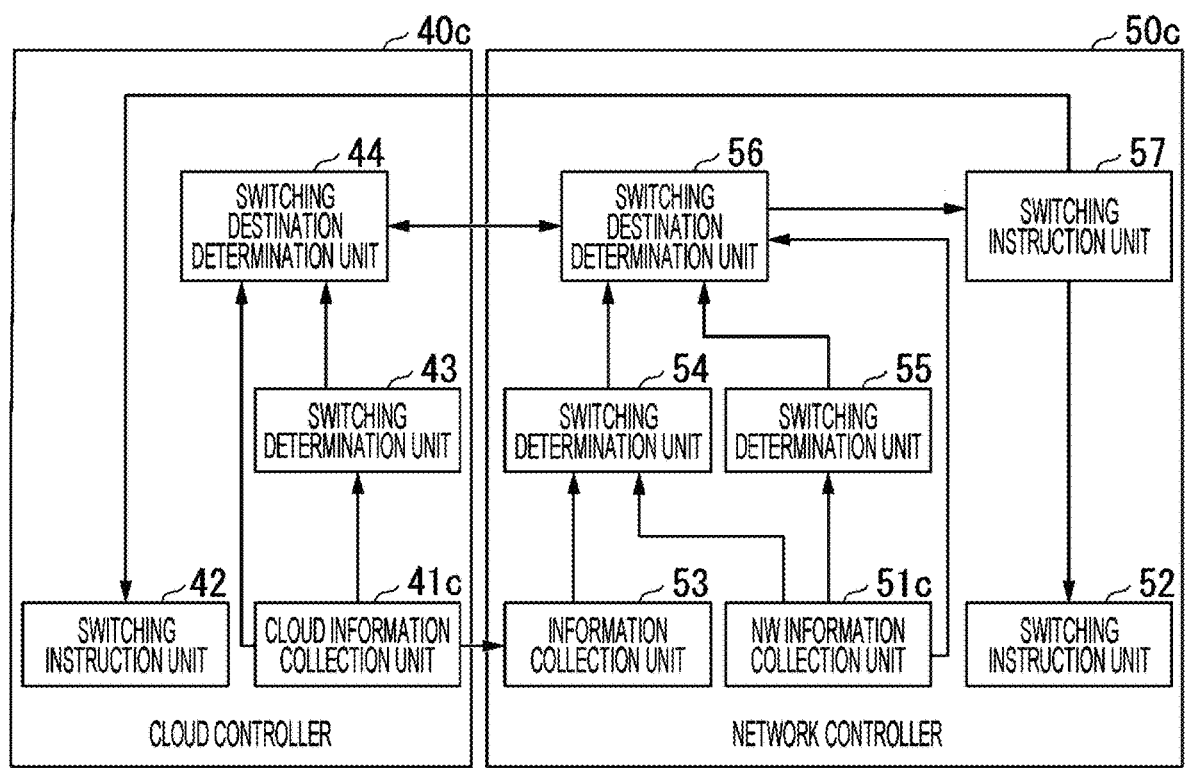
FIG. 8 is a diagram illustrating an example of functional configurations of a cloud controller and a network controller in a third embodiment.

FIG. 8 is a diagram illustrating an example of functional configurations of the cloud controller 40c and the network controller 50c in the third embodiment. First, the functional configuration of the cloud controller 40c will be described.

The cloud controller 40c includes a cloud information collection unit 41c, the switching instruction unit 42, a switching determination unit 43, and a switching destination determination unit 44. The cloud controller 40c has a configuration different from that of the cloud controller 40 in that the cloud information collection unit 41c is included instead of the cloud information collection unit 41, and the switching determination unit 43 and the switching destination determination unit 44 are newly included. Hereinafter, differences will be mainly described.

The cloud information collection unit 41c collects cloud information from each cloud resource 30. The cloud information collection unit 41c outputs, to the network controller 50c and the switching determination unit 43, determination information (for example, failure information on the cloud resource 30, delay information in the cloud resource 30, and a CPU usage rate of the cloud resource 30) necessary for determination of switching in the collected cloud information, and outputs, to the switching destination determination unit 44, other information (for example, setting information on the cloud resource 30 and resource information on a redundant facility (cloud resource 30-2)).

The switching determination unit 43 determines whether or not switching of the cloud resources 30 is necessary on the basis of the determination information output from the cloud information collection unit 41c. In a case where it is determined that switching is necessary, the switching determination unit 43 notifies the switching destination determination unit 44 of a switching notification including an effect that switching of the cloud resources 30 is necessary.

The switching destination determination unit 44 determines an optimal switching destination on the basis of the information obtained from the cloud information collection unit 41c and the switching determination unit 43. When determining the optimal switching destination, the switching destination determination unit 44 grasps the usage status of the cloud resource 30 and determines a switching destination of the cloud resource 30. The switching destination determination unit 44 is only required to determine the optimal switching destination by using a method of performing measurement by a total delay time, or a method in which the cloud resource 30 is converted into cost and a value of the cost is minimized. The switching destination determination unit 44 notifies the network controller 50c of information on the determined optimal switching destination candidate.

Note that, in a case where the switching destination candidate suitable for continuous provision of a service is found by switching only the cloud resources 30, the switching destination determination unit 44 may complete the processing without cooperating with a switching destination determination unit 56 of the network controller 50c.

Next, the functional configuration of the network controller 50c will be described.

The network controller 50c includes an NW information collection unit 51c, the switching instruction unit 52, an information collection unit 53, a switching determination unit 54, a switching determination unit 55, the switching destination determination unit 56, and a switching instruction unit 57. The network controller 50c has a configuration different from that of the network controller 50 in that the NW information collection unit 51c is included instead of the NW information collection unit 51, and the information collection unit 53, the switching determination unit 54, the switching determination unit 55, the switching destination determination unit 56, and the switching instruction unit 57 are newly included. Hereinafter, differences will be mainly described.

The NW information collection unit 51c collects NW information from each communication device 20. Note that the NW information collection unit 51c may collect an end-to-end delay time including a network delay and a cloud delay measured by the terminal device 10 via the communication devices 20. The NW information collection unit 51c outputs, to the switching determination unit 54 and the switching determination unit 55, determination information (for example, failure information on the communication devices 20 or the network, delay information on the network, and CPU usage rates of the communication devices 20) necessary for determination of switching in the collected NW information, and outputs, to the switching destination determination unit 56, other information (for example, setting information on the communication devices 20).

The information collection unit 53 collects the determination information output from the cloud controller 40c. The information collection unit 53 outputs the collected determination information to the switching determination unit 54.

The switching determination unit 54 integrally determines whether or not switching is necessary on the basis of the determination information output from the NW information collection unit 51c and the determination information output from the information collection unit 53. In a case where it is determined that switching is necessary, the switching determination unit 54 notifies the switching destination determination unit 56 of a switching notification including an effect that switching is necessary. As described above, in comparison with the switching determination unit 55, the switching determination unit 54 determines whether or not switching is necessary on the basis of a plurality of determination materials (for example, the determination information necessary for determination of switching in the cloud information and the determination information necessary for determination of switching in the NW information) rather than one determination material. That is, the switching determination unit 54 has a function corresponding to the switching determination unit 67b illustrated in FIG. 5.

The switching determination unit 55 determines whether or not switching of the paths of the network is necessary on the basis of the determination information output from the NW information collection unit 51c. In a case where it is determined that switching is necessary, the switching determination unit 55 notifies the switching destination determination unit 56 of a switching notification including an effect that setting of the communication devices 20 and switching of the paths are necessary.

The switching destination determination unit 56 determines an optimal switching destination on the basis of the information output from the switching destination determination unit 44 included in the cloud controller 40c, the switching notification output from the switching determination unit 54, and the switching notification output from the switching determination unit 55. In a case where switching of the cloud resources 30 is necessary, the switching destination determination unit 56 determines a final switching destination by cooperating with the switching destination determination unit 44 included in the cloud controller 40c. In the third embodiment, the switching destination determined by the switching destination determination unit 56 is the optimal switching destination. The switching destination determination unit 56 notifies the switching instruction unit 57 of information on the determined switching destination.

The switching instruction unit 57 notifies the switching instruction unit 42 of the cloud controller 40c of new cloud resource information and notifies the switching instruction unit 52 of new path information on the basis of switching destination information determined by the switching destination determination unit 56. Note that, in a case where the switching destination information determined by the switching destination determination unit 56 includes only information regarding switching of the paths of the network, the switching instruction unit 57 notifies the switching instruction unit 52 of new path information. Note that, in a case where the switching destination information determined by the switching destination determination unit 56 includes only information regarding switching of the cloud resources 30, the switching instruction unit 57 notifies the cloud controller 40c of new cloud resource information.

In the communication system 100 in the third embodiment configured as described above, the network controller 50c serves as a master, and the cloud controller 40c serves as a slave. Then, the switching destination finally determined by the network controller 50c is determined as the optimal switching destination. As a result, it is possible to obtain effects similar to those of the first embodiment and the second embodiment even without including the integrated controllers 60 and 60b as in the first embodiment and the second embodiment.

Modification 1

A configuration may be made in which the switching determination unit 43 included in the cloud controller 40c is included in the network controller 50c. In a case where such a configuration is made, the switching determination unit 43 determines whether or not switching of the cloud resources 30 is necessary on the basis of the determination information output from the information collection unit 53 included in the network controller 50c. In a case where it is determined that switching is necessary, the switching determination unit 43 notifies the cloud controller 40c of a switching notification including an effect that switching of the cloud resources 30 is necessary.

Modification 2

A configuration may be made in which the switching destination determination unit 44 included in the cloud controller 40c is included in the network controller 50c. In a case where such a configuration is made, the cloud controller 40c notifies the network controller 50c of setting information, and resource information on a redundant facility in addition to the switching notification.

Fourth Embodiment

In a fourth embodiment, a description will be given of a configuration in which a communication system does not include an integrated controller, and a cloud controller determines whether or not switching is necessary, determines a switching destination, and gives a switching instruction. That is, the fourth embodiment has a configuration in which a relationship between the master and the slave is reversed from that of the third embodiment.

The communication system 100 in the fourth embodiment includes the terminal device 10, the plurality of communication devices 20-1 to 20-4, the plurality of cloud resources 30-1 to 30-2, a cloud controller 40d, and a network controller 50d. The communication system 100 in the fourth embodiment has a configuration different from that of the communication system 100 in the first embodiment in that the integrated controller 60 is not included, and the cloud controller 40d and the network controller 50d are included instead of the cloud controller 40 and the network controller 50. Hereinafter, differences will be mainly described.

The cloud controller 40d is a control device that sets and monitors the cloud resources 30. The cloud controller 40d collects information regarding the cloud resources 30. In a case where it is determined that switching of the cloud resources 30 is necessary, the cloud controller 40d performs setting of a resource to be allocated to the terminal device 10 for the cloud resource 30 to be used by the terminal device 10.

Further, the cloud controller 40d determines optimal cloud resource arrangement and network path in consideration of usage statuses of the cloud resources 30 and a usage status of the network depending on at least one or both of NW information obtained from the network controller 50d and the collected cloud information. The cloud controller 40d instructs the network controller 50d to perform switching depending on the determined cloud resource arrangement and network path.

The network controller 50d sets and monitors the communication devices 20 and monitors the network. The network controller 50d collects information regarding the communication devices 20 and the network, and notifies the cloud controller 40d of the collected information. A trigger for the network controller 50d to transmit the information regarding the network to the cloud controller 40d may be periodic or only in a case where a predetermined condition is satisfied. In a case where an instruction for path switching is obtained from the cloud controller 40d, the network controller 50d gives an instruction for switching of the paths to a communication device 20 for which switching of the paths is necessary.

Further, the network controller 50d determines whether or not switching of the paths of the network is necessary on the basis of the collected NW information. In a case where it is determined that switching is necessary, the network controller 50d notifies the cloud controller 40d that setting of the communication devices 20 and switching of the paths are necessary.

Figure 9:
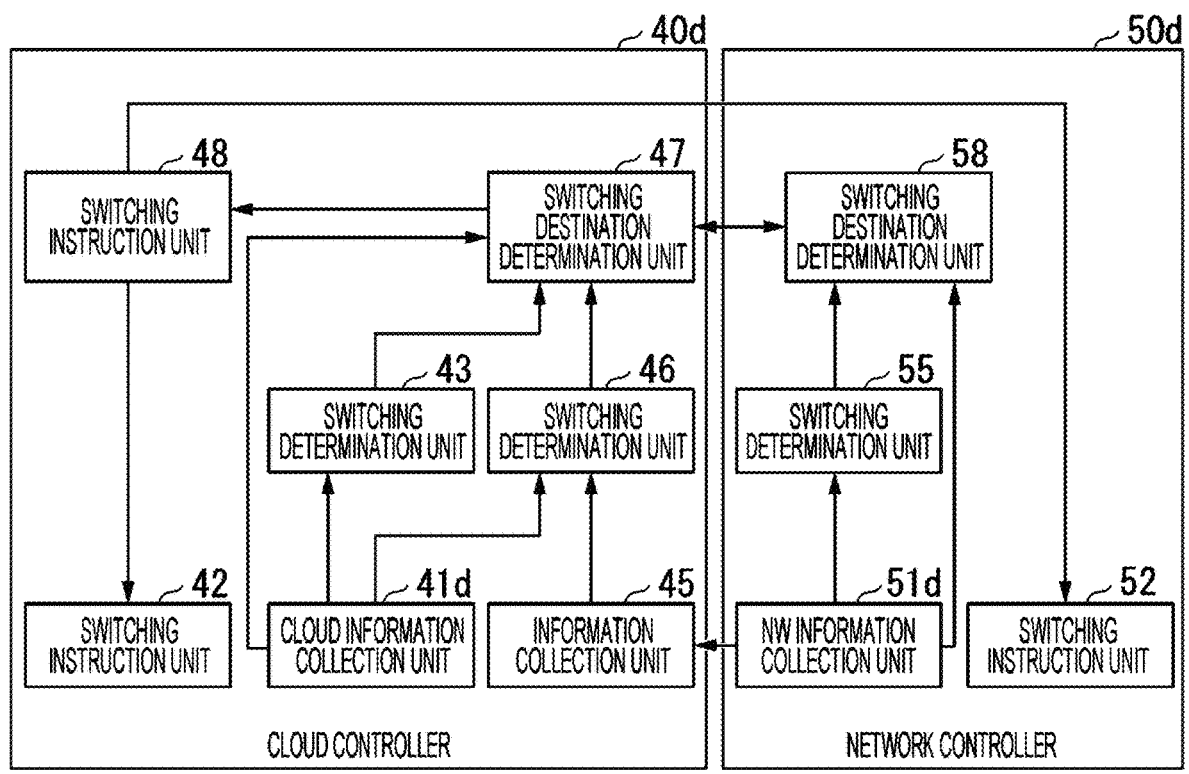
FIG. 9 is a diagram illustrating an example of functional configurations of a cloud controller and a network controller in a fourth embodiment.
Figure 10:
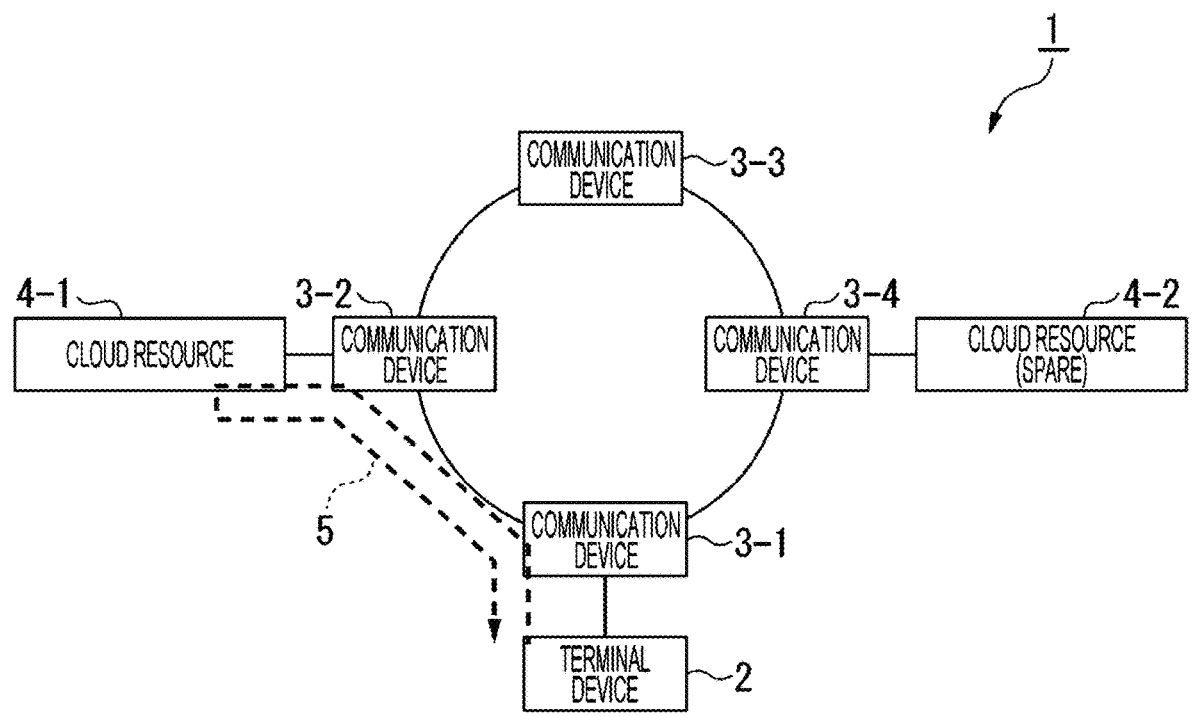
FIG. 10 is a diagram illustrating a configuration example of a conventional communication system.

FIG. 9 is a diagram illustrating an example of functional configurations of the cloud controller 40d and the network controller 50d in the fourth embodiment. First, the functional configuration of the cloud controller 40d will be described.

The cloud controller 40d includes a cloud information collection unit 41d, the switching instruction unit 42, the switching determination unit 43, an information collection unit 45, a switching determination unit 46, a switching destination determination unit 47, and a switching instruction unit 48. The cloud controller 40d has a configuration different from that of the cloud controller 40 in that the cloud information collection unit 41d is included instead of the cloud information collection unit 41, and the switching determination unit 43, the information collection unit 45, the switching determination unit 46, the switching destination determination unit 47, and the switching instruction unit 48 are newly included. Hereinafter, differences will be mainly described.

The cloud information collection unit 41d collects cloud information from each cloud resource 30. The cloud information collection unit 41d outputs, to the switching determination unit 43 and the switching determination unit 46, determination information (for example, failure information on the cloud resource 30, delay information in the cloud resource 30, and a CPU usage rate of the cloud resource 30) necessary for determination of switching in the collected cloud information, and outputs, to the switching destination determination unit 47, other information (for example, setting information on the cloud resource 30 and resource information on a redundant facility (cloud resource 30-2)).

The switching determination unit 43 determines whether or not switching of the cloud resources 30 is necessary on the basis of the determination information output from the cloud information collection unit 41d. In a case where it is determined that switching is necessary, the switching determination unit 43 notifies the switching destination determination unit 47 of a switching notification including an effect that switching of the cloud resources 30 is necessary.

The information collection unit 45 collects the determination information output from the network controller 50d. The information collection unit 45 outputs the collected determination information to the switching determination unit 46.

The switching determination unit 46 integrally determines whether or not switching is necessary on the basis of the determination information output from the cloud information collection unit 41d and the determination information output from the information collection unit 45. In a case where it is determined that switching is necessary, the switching determination unit 46 notifies the switching destination determination unit 47 of a switching notification including an effect that switching is necessary. As described above, in comparison with the switching determination unit 43, the switching determination unit 46 determines whether or not switching is necessary on the basis of a plurality of determination materials (for example, the determination information necessary for determination of switching in the cloud information and the determination information necessary for determination of switching in the NW information) rather than one determination material. That is, the switching determination unit 46 has a function corresponding to the switching determination unit 67b illustrated in FIG. 5.

The switching destination determination unit 47 determines an optimal switching destination on the basis of information output from a switching destination determination unit 58 included in the network controller 50d, the switching notification output from the switching determination unit 43, and the switching notification output from the switching determination unit 46. In a case where switching of the cloud resources 30 is necessary, the switching destination determination unit 47 determines a final switching destination by cooperating with the switching destination determination unit 58 included in the network controller 50d. In the fourth embodiment, the switching destination determined by the switching destination determination unit 47 is the optimal switching destination. The switching destination determination unit 47 notifies the switching instruction unit 48 of information on the determined switching destination.

The switching instruction unit 48 notifies the switching instruction unit 42 of new cloud resource information on the basis of the switching destination information determined by the switching destination determination unit 47, and notifies the switching instruction unit 52 of the network controller 50d of new path information. Note that, in a case where the switching destination information determined by the switching destination determination unit 47 includes only information regarding switching of the paths of the network, the switching instruction unit 48 notifies the switching instruction unit 52 of the network controller 50d of new path information. Note that, in a case where the switching destination information determined by the switching destination determination unit 47 includes only information regarding switching of the cloud resources 30, the switching instruction unit 48 notifies the switching instruction unit 42 of new cloud resource information.

Next, the functional configuration of the network controller 50d will be described.

The network controller 50d includes an NW information collection unit 51d, the switching instruction unit 52, the switching determination unit 55, and the switching destination determination unit 58. The network controller 50d has a configuration different from that of the network controller 50 in that the NW information collection unit 51d is included instead of the NW information collection unit 51, and the switching determination unit 55 and the switching destination determination unit 58 are newly included. Hereinafter, differences will be mainly described.

The NW information collection unit 51d collects NW information from each communication device 20. Note that the NW information collection unit 51d may collect an end-to-end delay time including a network delay and a cloud delay measured by the terminal device 10 via the communication devices 20. The NW information collection unit 51d outputs, to the switching determination unit 55 and the cloud controller 40d, determination information (for example, failure information on the communication devices 20 or the network, delay information on the network, and CPU usage rates of the communication devices 20) necessary for determination of switching in the collected NW information, and outputs, to the switching destination determination unit 58, other information (for example, setting information on the communication devices 20).

The switching determination unit 55 determines whether or not switching of the paths of the network is necessary on the basis of the determination information output from the NW information collection unit 51d. In a case where it is determined that switching is necessary, the switching determination unit 55 notifies the switching destination determination unit 58 of a switching notification including an effect that switching of the paths of the network is necessary.

The switching destination determination unit 58 determines an optimal switching destination on the basis of the information obtained from the NW information collection unit 51d and the switching determination unit 55. When determining the optimal switching destination, the switching destination determination unit 58 grasps the usage statuses of the communication devices 20 and determines a switching destination of the communication path. The switching destination determination unit 58 is only required to determine the optimal switching destination by using a method of performing measurement by a total delay time, or a method in which the cloud resource 30 is converted into cost and a value of the cost is minimized. The switching destination determination unit 58 notifies the cloud controller 40d of information on the determined optimal switching destination candidate.

In a case where the switching destination candidate suitable for continuous provision of a service is found by switching only the paths of the network, the switching destination determination unit 58 may complete the processing without cooperating with the switching destination determination unit 47 of the cloud controller 40d.

In the communication system 100 in the fourth embodiment configured as described above, the cloud controller 40d serves as a master, and the network controller 50d serves as a slave. Then, the switching destination finally determined by the cloud controller 40d is determined as the optimal switching destination. As a result, it is possible to obtain effects similar to those of the first embodiment and the second embodiment even without including the integrated controllers 60 and 60b as in the first embodiment and the second embodiment.

Modification 1

A configuration may be made in which the switching determination unit 55 included in the network controller 50d is included in the cloud controller 40d. In a case where such a configuration is made, the switching determination unit 55 determines whether or not switching of the paths of the network is necessary on the basis of the determination information output from the information collection unit 45 included in the cloud controller 40d. In a case where it is determined that switching is necessary, the switching determination unit 55 notifies the network controller 50d of a switching notification including an effect that switching of the paths of the network is necessary.

Modification 2

A configuration may be made in which the switching destination determination unit 58 included in the network controller 50d is included in the cloud controller 40d. In a case where such a configuration is made, the network controller 50d notifies the cloud controller 40d of setting information, and resource information on a redundant facility in addition to the switching notification.

Modification 1 Common to Each Embodiment

In each of the above embodiments, a case has been described where the cloud controllers 40, 40c, and 40d, the network controllers 50, 50c, and 50d, and the integrated controllers 60 and 60b are configured as different devices, as an example; however, the cloud controllers 40, 40c, and 40d, the network controllers 50, 50c, and 50d, and the integrated controllers 60 and 60b may be mounted on the same device using a virtualization technology. In a case where such a configuration is made, in the first embodiment, the cloud controller 40, the network controller 50, and the integrated controller 60 are mounted on the same device. In the second embodiment, the cloud controller 40, the network controller 50, and the integrated controller 60b are mounted on the same device. In the third embodiment, the cloud controller 40c and the network controller 50c are mounted on the same device. In the fourth embodiment, the cloud controller 40d and the network controller 50d are mounted on the same device.

Some functional units of the cloud controllers 40, 40c, and 40d, the network controllers 50, 50c, and 50d, and the integrated controllers 60 and 60b in the above-described embodiments may be implemented by a computer. In that case, a program for implementing functions thereof may be recorded in a computer-readable recording medium, and the program recorded in the recording medium may be read and executed by a computer system to implement the functions. Note that the "computer system" mentioned herein includes an OS and hardware such as peripheral devices.

In addition, the "computer-readable recording medium" refers to a portable medium such as a flexible disk, a magneto-optical disk, a read only memory (ROM), or a CD-ROM, or a storage device such as a hard disk included in the computer system. Further, the "computer-readable recording medium" may include a medium that dynamically holds the program for a short time, such as a communication wire in a case where the program is transmitted via a network such as the Internet or a communication line such as a telephone line, and a medium that holds the program for a certain period of time, such as a volatile memory inside the computer system serving as a server or a client in that case. In addition, the program may be for implementing some of the functions described above, may be implemented in a combination of the functions described above and a program already recorded in the computer system, or may be implemented with a programmable logic device such as a field programmable gate array (FPGA).

As described above, the embodiments of the present invention have been described in detail with reference to the drawings; however, the specific configuration is not limited to the embodiments and includes design and the like within the scope of the present invention.

INDUSTRIAL APPLICABILITY

The present invention can be applied to a communication system that uses cloud resources via a network.

REFERENCE SIGNS LIST

10 Terminal device
20, 20-1 to 20-4 Communication device
30 Cloud resource
40, 40c, 40d Cloud controller
50, 50c, 50d Network controller
60, 60b Integrated controller
45, 53, 61, 61b, 63, 63b Information collection unit
43, 46, 54, 55, 62, 64, 67b Switching determination unit
44, 47, 56, 58, 65, 65b Switching destination determination unit
66 Switching instruction unit
48, 57 Switching instruction unit
41, 41c, 41d Cloud information collection unit
42 Switching instruction unit
51, 51c, 51d NW information collection unit
52 Switching instruction unit

The invention claimed is:

1. A communication system that includes a plurality of cloud resources, and a plurality of communication devices provided on a path for using any one of the plurality of cloud resources,
the communication system comprising:
a cloud controller configured to collect cloud information regarding the plurality of cloud resources from each of the plurality of cloud resources and performs setting change of the plurality of cloud resources;
a network controller configured to collect network (NW) information regarding the plurality of communication devices and a network formed by the plurality of communication devices from each of the plurality of communication devices and gives an instruction for path switching in the plurality of communication devices; and
an integrated controller configured to:
collect the cloud information from the cloud controller,
collect the NW information from the network controller,
determine a switching destination by performing, in order based on a predetermined condition, first processing of searching for whether or not there is a switching destination candidate for continuous provision of a service by switching only communication paths, second processing of searching for whether or not there is a switching destination candidate for continuous provision of a service by switching only the plurality of cloud resources, and third processing of searching for whether or not there is a switching destination candidate for continuous provision of a service with both the communication paths and the plurality of cloud resources as switching targets, on a basis of the cloud information and the NW information collected, and
give at least one of an instruction for setting change of the plurality of cloud resources to the cloud controller or an instruction for path switching to the network controller to perform switching to the switching destination determined.

2. The communication system according to claim 1, wherein
the integrated controller determines, the switching destination in a case where a user uses a cloud resource, one of the plurality of cloud resources and the path for using the one of the plurality of cloud resources on the basis of the cloud information and the NW information.

3. The communication system according to claim 2, wherein
the integrated controller determines whether or not switching of the cloud resources is necessary on the basis of the cloud information collected, determines whether or not path switching is necessary on the basis of the NW information collected, and determines the switching destination in a case where it is determined that switching is necessary in any of determination results.

4. An integrated controller comprising:
a first information collector, stored in a memory, configured to collect cloud information from a cloud controller that collects the cloud information regarding a plurality of cloud resources from each of the plurality of cloud resources and performs setting change of the plurality of cloud resources;
a second information collector, stored in the memory, configured to collect network (NW) information from a network controller that collects the NW information regarding a plurality of communication devices provided on a path for using any one of the plurality of cloud resources and a network formed by the plurality of communication devices from each of the plurality of communication devices and gives an instruction for path switching in the plurality of communication devices;
a switching destination determination unit, stored in the memory, configured to determine a switching destination by performing, in order based on a predetermined condition, first processing of searching for whether or not there is a switching destination candidate for continuous provision of a service by switching only communication paths, second processing of searching for whether or not there is a switching destination candidate for continuous provision of a service by switching only the plurality of cloud resources, and third processing of searching for whether or not there is a switching destination candidate for continuous provision of a service with both the communication paths and the plurality of cloud resources as switching targets; and
a switching instructor, stored in the memory, configured to give at least one of an instruction for setting change of the cloud resources to the cloud controller or an instruction for path switching to the network controller to perform switching to the switching destination determined by the switching destination determiner.

5. A control device comprising:
a switching determiner, stored in a memory, configured to determine whether or not switching of at least one of cloud resources or communication paths is necessary on a basis of both cloud information regarding a plurality of cloud resources and network (NW) information regarding a plurality of communication devices provided on a path for using any one of the plurality of cloud resources and a network formed by the plurality of communication devices;

a switching destination determiner, stored in the memory, configured to determine a switching destination on a basis of a determination result by the switching determiner, the cloud information, and the NW information; and a switching instructor, stored in the memory, configured to give at least one of an instruction for setting change of the plurality of cloud resources or an instruction for switching of the communication paths to perform switching to the switching destination determined by the switching destination determiner, wherein the switching destination determiner determines the switching destination by performing, in order based on a predetermined condition, first processing of searching for whether or not there is a switching destination candidate for continuous provision of a service by switching only the communication paths, second processing of searching for whether or not there is a switching destination candidate for continuous provision of a service by switching only the plurality of cloud resources, and third processing of searching for whether or not there is a switching destination candidate for continuous provision of a service with both the communication paths and the plurality of cloud resources as switching targets.

6. The control device according to claim 5, further comprising:

a cloud switching determiner, stored in the memory, configured to determine whether or not switching of the plurality of cloud resources is necessary on the basis of the cloud information; and a path switching determiner, stored in the memory, configured to determine whether or not switching of the communication paths is necessary on the basis of the NW information, wherein the switching destination determiner determines the switching destination further on a basis of a determination result by the cloud switching determiner and a determination result by the path switching determiner.

* * * * *